United States Patent
Park et al.

(10) Patent No.: US 6,597,738 B1
(45) Date of Patent: Jul. 22, 2003

(54) MOTION DESCRIPTOR GENERATING APPARATUS BY USING ACCUMULATED MOTION HISTOGRAM AND A METHOD THEREFOR

(75) Inventors: Cheol-Soo Park, Suwon (KR); Hae-Kwang Kim, Seoul (KR); Joo-Hee Moon, Seoul (KR)

(73) Assignee: Hyundai Curitel, Inc. (KR)

( * ) Notice: Subject to any disclaimer, the term of this patent is extended or adjusted under 35 U.S.C. 154(b) by 0 days.

(21) Appl. No.: 09/384,163

(22) Filed: Aug. 27, 1999

(30) Foreign Application Priority Data

Feb. 1, 1999 (KR) .............................. 99-3259
Aug. 4, 1999 (KR) ............................ 99-31942

(51) Int. Cl.[7] .............................. H04B 1/66; G06K 9/00
(52) U.S. Cl. ................... 375/240.16; 382/107; 382/168
(58) Field of Search ........................ 375/240.09, 240.16, 375/240.24, 240.08; 348/420.1, 422.1, 402.1, 413.1, 416.1, 431.1, 699, 700; 382/168, 107, 225, 170, 173, 305, 236, 243; 345/428

(56) References Cited

U.S. PATENT DOCUMENTS

| | | | | |
|---|---|---|---|---|
| 5,805,745 A | * | 9/1998 | Graf .......................... | 382/170 |
| 5,969,772 A | * | 10/1999 | Saeki ......................... | 348/699 |
| 5,995,095 A | * | 11/1999 | Ratakonda ................... | 382/225 |
| 6,181,817 B1 | * | 1/2001 | Zabih et al. ................ | 382/170 |
| 6,263,089 B1 | * | 7/2001 | Otsuka et al. .............. | 382/107 |
| 6,268,864 B1 | * | 7/2001 | Chen et al. ................. | 345/428 |

FOREIGN PATENT DOCUMENTS

| DE | 4112235 A1 | 5/1992 | ........... G06F/15/70 |
|---|---|---|---|

OTHER PUBLICATIONS

IEEE Transactions on Communications, "Adaptive Motion Estimation Based on Texture Analysis", vol. 42, Feb. 1, 1994, V. Seferidis and M. Ghanbari, 11 pages.

1993 Elsevier Science Publishers, "Motion detection using image histogram sequence analysis", Feb. 1, 1993, P. Iliev and L. Tsekov, 12 pages.

1991 IEEE, "Accumulative Difference Method for Human Body Motion Segmentation In a Real–World Scene", Chen Yi, Fu Yuquing, 4 pages.

* cited by examiner

*Primary Examiner*—Gims S. Philippe
(74) *Attorney, Agent, or Firm*—Blakely Sokoloff Taylor & Zafman

(57) ABSTRACT

A motion descriptor generating apparatus using accumulated motion histogram and a method therefor. Accumulated motion histograms are generated and motion descriptors are generated by using the accumulated motion histograms. The motion descriptor generating apparatus uses an accumulated motion histogram and includes a motion histogram generating unit for respectively generating a motion histogram with relation to intensity data and direction data of an input motion. An accumulated motion histogram generating unit generates a two-dimensional accumulated motion histogram in a predetermined sequence by using the motion histogram which is generated in the motion histogram generating unit. A motion descriptor generating unit structures (hierarchy structure) video into certain units according to a change amount of the accumulated motion histogram based on a lapse of time, which is generated in the accumulated motion intensity histogram generating unit. A motion descriptor is generated which describes motion characteristics with relation to the respective structured units.

84 Claims, 29 Drawing Sheets

FIG. 5
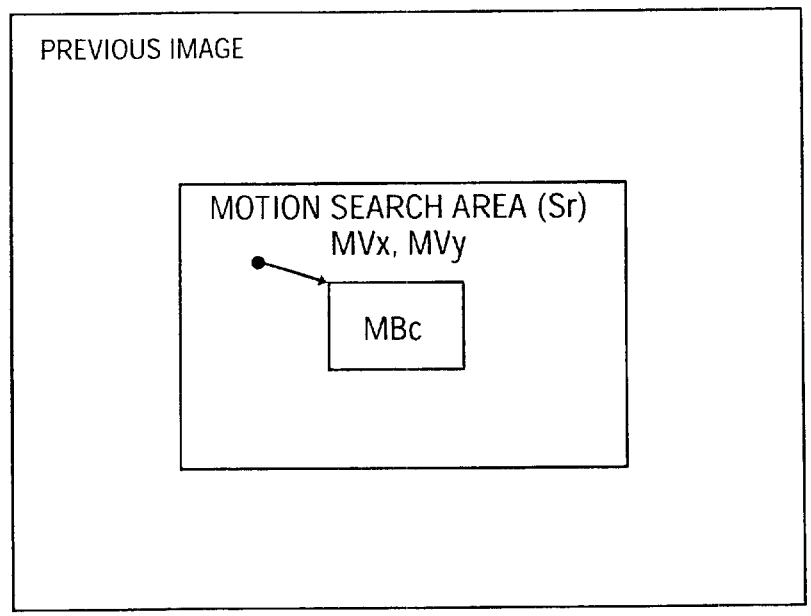
FIG. 6A         FIG. 6B         FIG. 6C
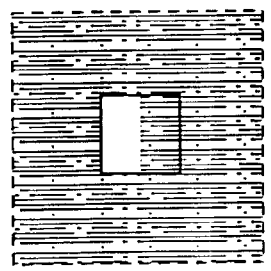    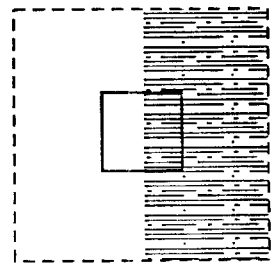    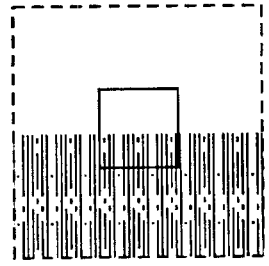
⌐ ¬
¦ ¦ MOTION SEARCH AREA
└ ┘
☐ MRc

MOTION DESCRIPTOR GENERATING APPARATUS BY USING ACCUMULATED MOTION HISTOGRAM AND A METHOD THEREFOR

BACKGROUND OF THE INVENTION

1. Field of the Invention

The present invention relates to a motion descriptor generating apparatus by using accumulated motion histogram and a method therefor, in which after motion information onto a video concept is processed in view of human perceptual characteristics, accumulated motion histogram is generated and a motion descriptor is generated by using the accumulated motion histogram, thereby being applicable to multi-media database or search system, that is, video application fields.

2. Description of the Conventional Art

Recently, due to the continuous development of expression media, delivery media, storing media and operating these media, demands for free production of large capacity of multimedia data rather than a mono media, rapid search and convenient use and reuse has a tendency toward increasing. The demands for production of free multimedia have been satisfied with according to the development of electronic expression media, and therefore, huge amount of mono-media or multimedia data become scattered on personal or public systems.

However, as the amount of multimedia data increase, time and expense required for searching data to use or reuse become proportionally increased. Therefore, in order to increase the speed and efficiency of data search, it has been researched and developed new search techniques which include the widely-known character-based search technique and have composite information attribute, thereby being suitable for efficient data search of multimedia.

In order to perform search and index of the multimedia data efficiently, it is necessary to achieve minimization of the number of information attribute which express respective media data, simplification of whole procedures and real-time processing. Furthermore, it is necessary to guarantee effectiveness and variety of information attribute to express and flexibility of search.

Further the subjective similarity and the objective similarity of search result is the important factors to evaluate the performance of search. The importance of the subjective similarity is resulted from the limitation in the representation of information characteristics which describes the media data characteristics. Therefore, even though the objective similarity is large, the validity and utility of the search are degraded if the search result as desired by users. Accordingly, it has been continuously studied to develop methods which may reflect subjective similarity to the information attribute which expresses the media data characteristics.

The difference between character-based search and multimedia data-based search, which are both widely used in the fields, is the difficulty of information attribute extraction and variety of information attribute description.

In the view of the difficulty of information attribute extraction, even though it is possible to conduct a search the character data by indexing several principal words and sentences in a document, the data size is to large and lots of media are mixed in case of multimedia so that a proper preprocessing is required in order to obtain new valid information attribute in which information attributes are organically combined each other.

The preprocessing is performed to extract valid characteristics information and to give validity to the procedure. In addition, even though a method is able to detect valid characteristics information; the method can not be put into practical in the application fields that the large amount of multimedia data should be processed in a short time or terminal systems have bad performance, if the expense for hardware (H/W) and software (S/W) in the procedure.

Now, the variety of information attribute description will be described in case of video search, as an example. The video is mixed with various media information such as images, voice, sound, etc. Therefore, after valid information attribute is extracted by preprocessing the information attribute of the respective mono-media data or the information attribute of multimedia which is mixed with more than two media, the data search in the various type be conducted by using the extracted information attribute. For example, in order to search the video, information attribute of images may be utilized and it is also possible to utilize the combined information attribute of images and voices. Therefore, the search which utilizes the various multimedia attributes is more effective than that which utilizes only a single mono-media attributes.

Nowadays, most of studies have been concentrated on the field of stop image which is easier to obtain data in multimedia data indexing and search. The still image is widely utilized in the fields of storing system such as digital electronic steel cameras and image database, transmission system such as stop image transmission device or audio graphic conference and image conference, and printing system such as a printer. The still image indexing or search is the image search method based on the content. Therefore, the importance resides on the extraction, indexing and search method of characteristics information which has a consistent characteristic with relation to the change such as rotation, scale, and translation of the color, texture and shape of the images.

The video search fields is not easy to obtain data comparing with the stop image and limited in its application due to the large capacity of data to store and process. However, owing to the rapid development of the transmission media and storing media such as discs, tapes and cd roms, the expense required for obtaining the data decreases-and owing to the tendency of minimizing of the necessary devices, the study in this fields becomes vigorous. In general, the video refers all the series of images which have sequence in the continuous time. Therefore, the video has the spatial redundancy (repetition) in an image and between images, which is the difference of the characteristics of the video images from the stop images. In the video search method, the reducdance between images may be importantly utilized in the extraction of the characteristics information.

The redundancy between video frames may be measured by using the motion degree. For example, if the redundancy is large, it means that the size of region is large and the motion between the region is small. On the other hand, if the redundancy is small, it means that the size of region is small and the motion between the region is large. At present, video compression methods, of which standardization is finished, adopt motion estimation between images (BMA-Block Matching Algorithm) for thereby improving data compression efficiency (H.261, H.263, MPEG-1, MPEG-2, MPEG-4).

In the conventional video search method, a certain temporal position (hereinafter, to be referred to "clip") of certain units is structured on the basis of changes in the color, texture, shape and motion between images, several key frames, which represent meaning characteristics and signal characteristics of the images in the clip, are selected, and the characteristics information are extracted with relation to the information attributes of the selected key frames to perform them in indexing or search.

In the video structuring, general structure is to be a hierarchical structure which is comprised of basic unit "shot" which is a series of stop images having no temporal disconnection, "Scene" which is a series of continuous shots, having temporal and spatial continuity in the content, and "Story" which is a series of continuous scenes in the four steps of composition.

FIG. 17B shows the general video structure. The video structuring may be achieved in the type of an event tree on the basis of signal characteristics. In the video structuring, the structuring information of the signal characteristics and the significant characteristics may exist together on the basis of correlated link.

In FIG. 17B, the segment tree as shown in the left side and the segment tree as shown in the right side are linked together in the direction as shown by the arrow. For example, if Clinton case which is structured in the event tree is searched, the video link is carried on the event tree from segment 1 to a video of shot 2 of sub-segment 1 and a video of shot 3 of the segment 3.

Further, a single stop image may be also structured. For example, in case of a photograph that a person is in a forest, the structuring is advanced in such a manner that the person and the forest structure an object, face and body structure the person, and eyes, nose, ears, etc, structure the face, as shown in FIG. 17A. FIG. 17A is a view for explaining the structuring of a stop image. In FIG. 17A, it is possible to structure the signal in the shape of region tree which is on the basis of signal characteristics in the images and the meaning in the shape of object tree which is on the basis of objects having sensory meaning in the images. In general, the signal structuring is performed by semi-automatic and automatic stop structuring, while the meaning structuring, which is the conceptional structuring, is performed manually by users by means of manual structuring method.

In the structure of the stop image, as shown in FIG. 17A, the structuring information of the signal characteristics and the meaning characteristics may exist together on the basis of correlated link between the region tree which is shown in the left side and the object tree which is shown in the right side.

The sound signal is comprised of background noise, people's conversation voices, and background music.

The video structuring becomes more precise as the number of images of a video increases and has an advantage that the search may be conducted faster by this video structuring than by the indexing which utilizes the variety of characteristics.

FIG. 18 is a view for explaining the video structuring by the unit of "scene".

The indexing and search methods by using the key frames do not describe any characteristics of the signal characteristics, temporal and spatial distributions and changes with relation to the whole video, images between the key frames, and a specific temporal period so that the methods have disadvantages that it is not suitable for such applications which requires the above characteristics which can not described by the key frames.

SUMMARY OF THE INVENTION

The present invention is derived to resolve the disadvantages of the conventional techniques and it is an object of the present invention to provide a motion descriptor generating apparatus by using accumulated motion histogram and a method therefor, in which perceptual characteristics of user may be reflected in the motion indexing and search of video content, for thereby supporting the users' indexing and search in various stages.

In order to achieve the above objects of the present invention, it is provided a motion descriptor generating apparatus by using accumulated motion histogram, which includes a motion histogram generating unit for respectively generating motion histogram with relation to intensity data and direction data of an input motion, an accumulated motion histogram generating unit for generating two-dimensional accumulated motion histogram in a predetermined sequence by using the motion histogram which is generated in the motion histogram generating unit, and a motion descriptor generating unit for structuring (hierarchicy structure) video into certain units according to a change amount of the accumulated motion histogram with the lapse of time, which is generated in the accumulated motion intensity histogram generating unit, and generating motion descriptor which describes motion characteristics with relation to the respective structured units.

In order to achieve the above objects of the present invention, it is provided a method for generating motion descriptors by using accumulated motion histogram, which includes the steps of generating motion histogram for input motion intensity and direction data, generating accumulated motion histogram for generating two-dimensional accumulated motion histogram from the generated motion histogram in a predetermined sequence, and structuring (hierarchy structure) video into certain units with relation to the generated accumulated motion histogram according to a change amount with the time lapse, and generating a motion descriptor for describing motion characteristics for the respective structured units.

In order to achieve the above objects of the present invention, it is provided a motion descriptor generating apparatus by using accumulated motion histogram, which includes a motion intensity computing unit for computing intensity (degree) of input motion intensity information, a motion intensity histogram generating unit for generating motion intensity histogram with relation to the motion intensity information which is computed by the motion intensity computing unit, an accumulated motion intensity histogram generating unit for generating two-dimensional accumulated motion intensity histogram in a predetermined sequence by using the motion intensity histogram which is generated in the motion intensity histogram generating unit, a motion descriptor generating unit for structuring (hierarchy structure) video into certain units according to a change amount of the accumulated motion intensity histogram with the lapse of time, which is generated in the accumulated motion intensity histogram generating unit, and generating a motion descriptor which describes motion characteristics with relation to the respective structured units.

In order to achieve the above objects of the present invention, it is provided a motion descriptor generating apparatus by using accumulated motion histogram, which includes a motion direction computing unit for computing direction of input motion direction information, a motion direction histogram generating unit for generating motion direction histogram with relation to the motion direction information which is computed by the motion direction computing unit, an accumulated motion direction histogram generating unit for generating two-dimensional accumulated motion direction histogram in a predetermined sequence by using the motion direction histogram which is generated in the motion direction histogram generating unit, and a motion descriptor generating unit for structuring (hierarchy structure) video into certain units according to a change amount of the accumulated motion direction histogram with the lapse of time, which is generated in the accumulated motion direction histogram generating unit, and generating a motion descriptor which describes motion characteristics with relation to the respective structured units.

5. In order to achieve the above objects of the present invention, it is provided a motion descriptor generating apparatus by using accumulated motion histogram, which includes a motion intensity computing unit for computing intensity (degree) of input motion intensity information, a motion intensity histogram generating unit for generating motion intensity histogram with relation to the motion intensity information which is computed by the motion intensity computing unit, an accumulated motion intensity histogram generating unit for generating two-dimensional accumulated motion intensity histogram in a predetermined sequence by using the motion intensity histogram which is generated in the motion intensity histogram generating unit, a motion direction computing unit for computing direction of input motion direction information, a motion direction histogram generating unit for generating motion direction histogram with relation to the motion direction information which is computed by the motion direction computing unit, an accumulated motion direction histogram generating unit for generating two-dimensional accumulated motion direction histogram in a predetermined sequence by using the motion direction histogram which is generated in the motion direction histogram generating unit, and a motion descriptor generating unit for structuring (hierarchy structure video into certain units according to change amounts of the accumulated motion intensity and direction histograms with the lapse of time, which are generated in the accumulated motion intensity and direction histogram generating unit, and generating motion descriptors which describe motion characteristics with relation to the respective structured units.

In order to achieve the above objects of the present invention, it is provided a method for generating motion descriptors by using accumulated motion histogram, which includes the steps of motion intensity computing for computing intensity (degree) of input motion intensity information, motion intensity histogram generating for generating motion intensity histogram with relation to the motion intensity information which is computed in the step of motion intensity computing, accumulated motion intensity histogram generating for generating two-dimensional accumulated motion intensity histogram in a predetermined sequence by using the motion intensity histogram which is generated in the step of motion intensity histogram generating, and motion descriptor generating for structuring (hierarchy structure ) video into certain units according to a change amount of the accumulated motion intensity histogram with the lapse of time, which is generated in the step of accumulated motion intensity histogram generating, and generating a motion descriptor which describes motion characteristics with relation to the respective structured units.

In order to achieve the above objects of the present invention, it is provided a method for generating motion descriptors by using accumulated motion histogram, which includes the steps of motion direction computing for computing direction of input motion direction information, motion direction histogram generating for generating motion direction histogram with relation to the motion direction information which is computed by the step of motion direction computing, accumulated motion direction histogram generating for generating two-dimensional accumulated motion direction histogram in a predetermined sequence by using the motion direction histogram which is generated in the step of motion direction histogram generating, and motion descriptor generating for structuring (hierarchy structure) video into certain units according to a change amount of the accumulated motion direction histogram with the lapse of time, which is generated in the step of accumulated motion direction histogram generating, and generating a motion descriptor which describes motion characteristics with relation to the respective structured units.

In order to achieve the above objects of the present invention, it is provided a method for generating motion descriptors by using accumulated motion histogram, which includes motion intensity computing for computing intensity (degree) of input motion intensity information, motion intensity histogram generating for generating motion intensity histogram with relation to the motion intensity information which is computed by the step of motion intensity computing, accumulated motion intensity histogram generating for generating two-dimensional accumulated motion intensity histogram in a predetermined sequence by using the motion intensity histogram which is generated in the step of motion intensity histogram generating, motion direction computing for computing direction of input motion direction information, motion direction histogram generating for generating motion direction histogram with relation to the motion direction information which is computed by the step of motion direction computing, accumulated motion direction histogram generating for generating two-dimensional accumulated motion direction histogram in a predetermined sequence by using the motion direction histogram which is generated in the step of motion direction histogram generating, and motion descriptor generating for structuring (hierarchy structure) video into certain units according to change amounts of the accumulated motion intensity and direction histograms with the lapse of time, which are generated in the steps of accumulated motion intensity and direction histograms generating, and generating motion descriptors which describe motion characteristics with relation to the respective structured units.

BRIEF DESCRIPTION OF THE DRAWINGS

The present invention will become more fully understood from the detailed description given hereinbelow accompanying drawings which are given by way of illustration only, and thus are not limitative of the present invention, and wherein:

FIG. 5 is a view for explaining a method for motion estimation between images of the motion estimation value divergence unit in FIG. 2 by using BMA Block Matching Algorithm;

FIG. 6A to FIG. 6C are views for explaining motion estimation value divergence;

BRIEF DESCRIPTION OF PREFERRED EMBODIMENTS

The present invention will now be described with reference to accompanying drawings in more detail.

FIG. 1A to FIG. 1J are schematic block diagrams showing a motion descriptor generating apparatus by using accumulated motion histogram.

Figure 1A:
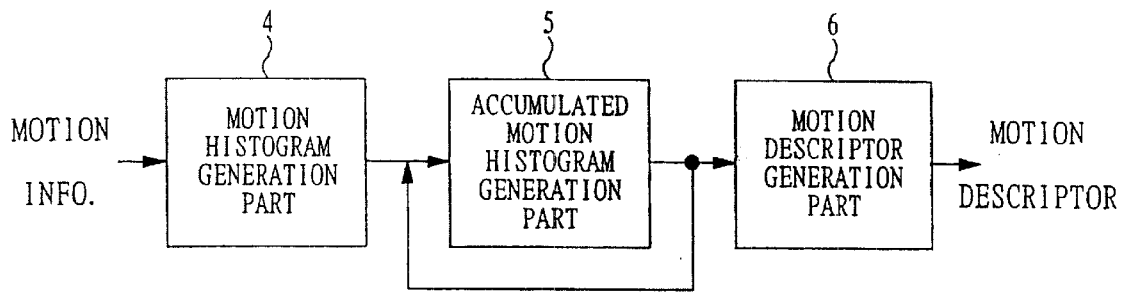
FIG. 1A to FIG. 1J are schematic block diagrams showing a motion descriptor generating apparatus by using accumulated motion histogram.

As shown in FIG. 1A, a motion descriptor generating apparatus by using accumulated motion histogram, according to a preferred embodiment of the present invention, includes a motion histogram generating unit 4 for respectively generating motion histogram with relation to intensity data and direction data of an input motion, an accumulated motion histogram generating unit 5 for generating two-dimensional accumulated motion histogram in a predetermined sequence by using the motion histogram which is generated in the motion histogram generating unit 4, and a motion descriptor generating unit 6 for structuring (hierarchy structure) video into certain units according to a change amount of the accumulated motion histogram with the lapse of time, which is generated in the accumulated motion intensity histogram generating unit 5, and generating a motion descriptor which describes motion characteristics with relation to the respective structured units.

Figure 1B:
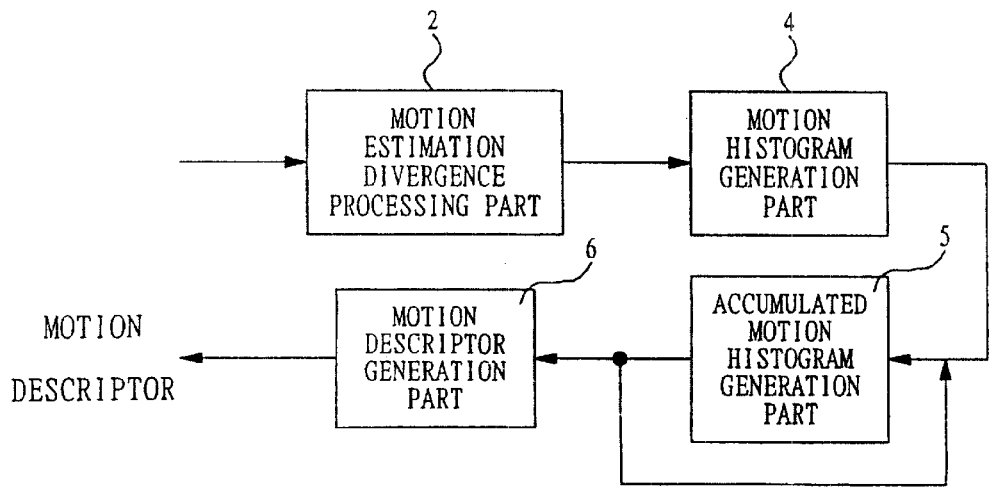

As shown in FIG. 1B, a motion descriptor generating apparatus by using accumulated motion histogram, according to a preferred embodiment of the present invention, includes a motion estimation value divergence unit 2 for providing estimation values of motion intensity and direction, which are processed according to external frame selection mode, a motion histogram generating unit 4 for respectively generating motion histograms with relation to intensity data and direction data of input motion from the motion estimation value divergence unit 2, an accumulated motion histogram generating unit 5 for generating two-dimensional accumulated motion histogram in a predetermined sequence by using the motion histogram which is generated in the motion histogram generating unit 4, and a motion descriptor generating unit 6 for structuring (hierarchy structure) video into certain units according to a change amount of the accumulated motion histogram with the lapse of time, which is generated in the accumulated motion intensity histogram generating unit 5, and generating a motion descriptor which describes motion characteristics with relation to the respective structured units.

Figure 1C:
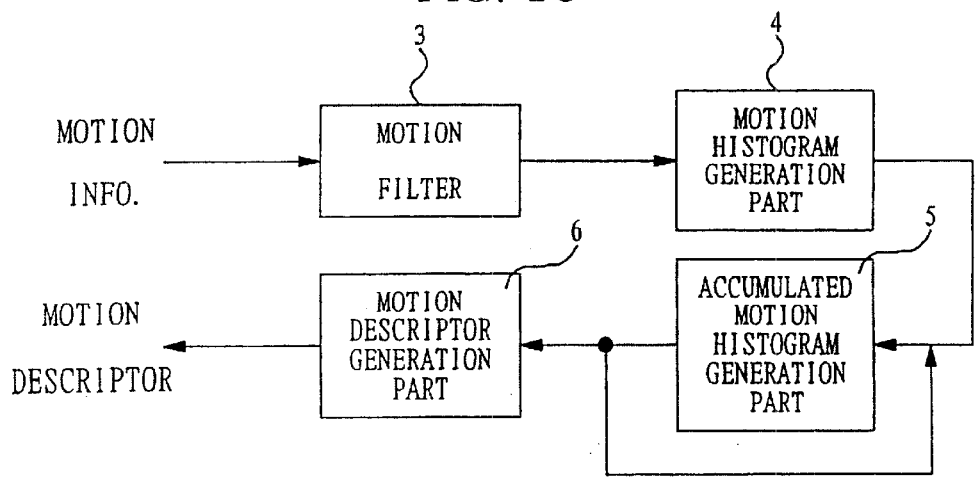

Referring to FIG. 1C, a motion descriptor generating apparatus by using accumulated motion histogram, according to a preferred embodiment of the present invention, includes a motion filtering unit 3 for performing visual filtering of intensity and direction information of an input motion estimation value, a motion histogram generating unit 4 for respectively generating motion histograms with relation to the intensity data and direction data of the input motion which is filtered by the motion filtering unit 3, an accumulated motion histogram generating unit 5 for generating two-dimensional accumulated motion histogram in a predetermined sequence by using the motion histogram which is generated in the motion histogram generating unit 4, and a motion descriptor generating unit 6 for structuring (hierarchy structure) video into certain units according to a change amount of the accumulated motion histogram with the lapse of time, which is generated in the accumulated motion intensity histogram generating unit 5, and generating a motion descriptor which describes motion characteristics with relation to the respective structured units.

Figure 1D:
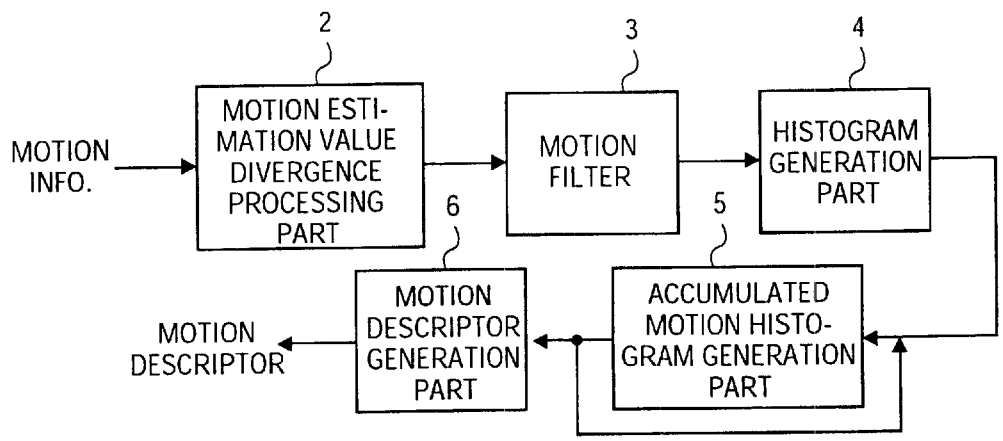

Referring to FIG. 1D, a motion descriptor generating apparatus by using accumulated motion histogram, according to a preferred embodiment of the present invention, includes a motion estimation value divergence unit 2 for providing estimation value of motion intensity and direction, which are processed according to an external frame selection mode, a motion filtering unit 3 for performing visual filtering of intensity and direction information of a motion estimation values which are input from the motion estimation value divergence unit 2, a motion histogram generating unit 4 for respectively generating motion histograms with relation to the intensity data and direction data of the input motion which is filtered by the motion filtering unit 3, an accumulated motion histogram generating unit 5 for generating two-dimensional accumulated motion histogram in a predetermined sequence by using the motion histogram which is generated in the motion histogram generating unit 4, and a motion descriptor generating unit 6 for structuring (hierarchy structure) video into certain units according to a change amount of the accumulated motion histogram with the lapse of time, which is generated in the accumulated motion intensity histogram generating unit 5, and generating a motion descriptor which describes motion characteristics with relation to the respective structured units.

Figure 1E:
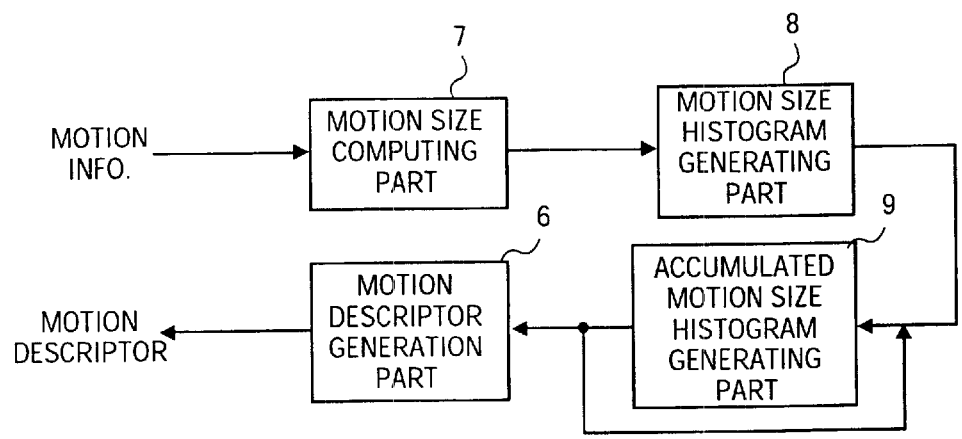

Referring to FIG. 1E, a motion descriptor generating apparatus by using accumulated motion histogram according to a preferred embodiment of the present invention includes a motion intensity computing unit 7 for computing intensity (degree) of input motion intensity information, a motion intensity histogram generating unit 8 for generating motion intensity histogram with relation to the motion intensity information which is computed by the motion intensity computing unit 7, an accumulated motion intensity histogram generating unit 9 for generating two-dimensional accumulated motion intensity histogram in a predetermined sequence by using the motion intensity histogram which is generated in the motion intensity histogram generating unit 8, a motion descriptor generating unit 9 for structuring (hierarchy structure) video into certain units according to a change amount of the accumulated motion intensity histogram with the lapse of time, which is generated in the accumulated motion intensity histogram generating unit 9, and generating a motion descriptor which describes motion characteristics with relation to the respective structured units.

Figure 1F:
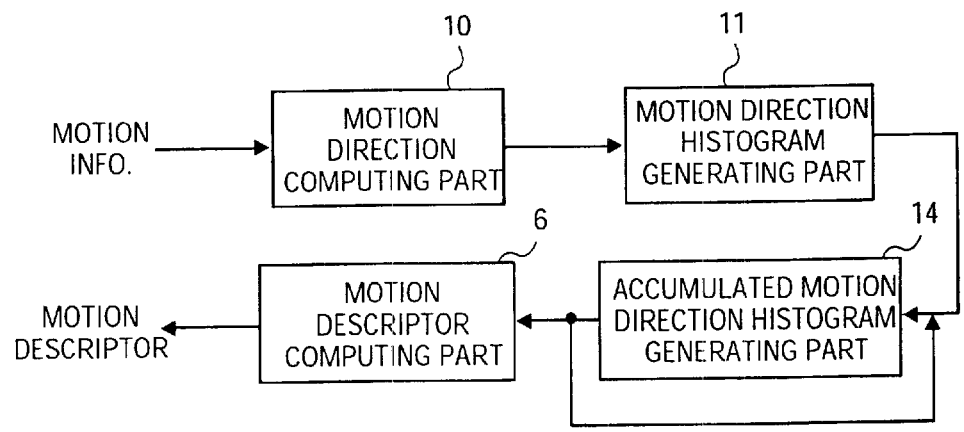

Referring to FIG. 1F, a motion descriptor generating apparatus by using accumulated motion histogram according to the present invention includes a motion direction computing unit 10 for computing direction of input motion direction information, a motion direction histogram generating unit 11 for generating motion direction histogram with relation to the motion direction information which is computed by the motion direction computing unit 10, an accumulated motion direction histogram generating unit 14 for generating two-dimensional accumulated motion direction histogram in a predetermined sequence by using the motion direction histogram which is generated in the motion direction histogram generating unit 11, and a motion descriptor generating unit 6 for structuring (hierarchy structure) video into certain units according to a change amount of the accumulated motion direction histogram with the lapse of time, which is generated in the accumulated motion direction histogram generating unit 14, and generating a motion descriptor which describes motion characteristics with relation to the respective structured units.

Figure 1G:
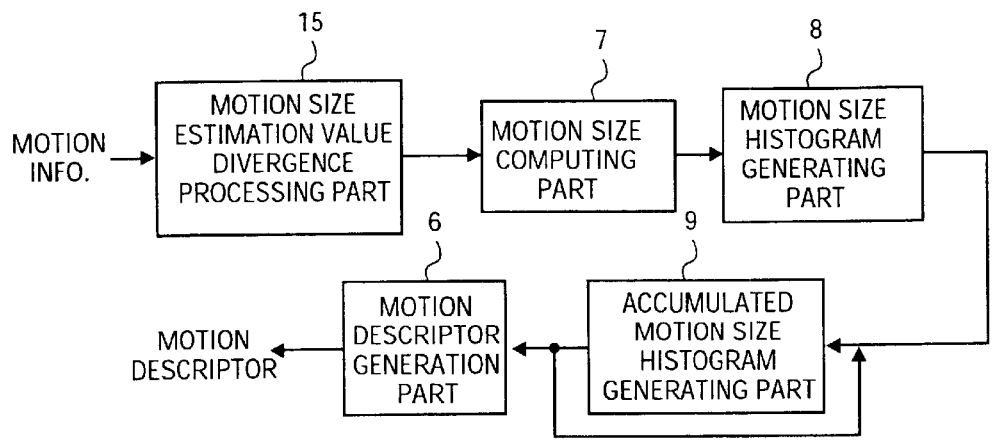

Referring to FIG. 1G, a motion descriptor generating apparatus by using accumulated motion histogram according to a preferred embodiment of the present invention includes an output unit 15 of motion intensity estimation value for processing to output a estimation value of motion intensity according to external frame selection mode, a motion intensity computing unit 7 for computing intensity (degree) of input motion intensity information which is provided from the motion intensity estimation value output unit 15, a motion intensity histogram generating unit 8 for generating motion intensity histogram with relation to the motion intensity information which is computed by the motion intensity computing unit 7, an accumulated motion intensity histogram generating unit 9 for generating two-dimensional accumulated motion intensity histogram in a predetermined sequence by using the motion intensity, histogram which is generated in the motion intensity histogram generating unit 8, a motion descriptor generating unit 9 for structuring (hierarchy structure) video into certain units according to a change amount of the accumulated motion intensity histogram with the lapse of time, which is generated in the accumulated motion intensity histogram generating unit 9, and generating a motion descriptor which describes motion characteristics with relation to the respective structured units.

Figure 1H:
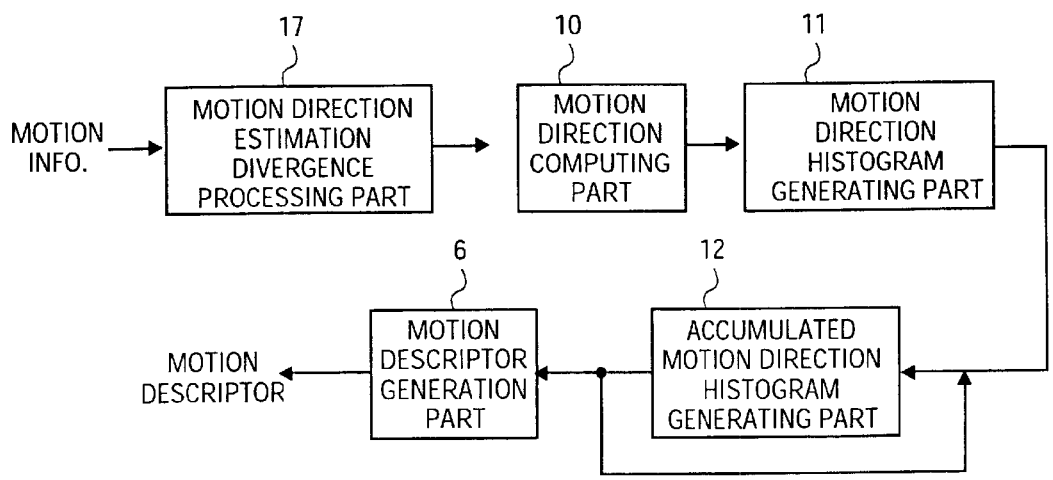

Referring to FIG. 1H, a motion descriptor generating apparatus by using accumulated motion histogram according to the present invention includes an output unit 17 of motion direction estimation value to provide the motion direction estimation value according to external frame selection mode, a motion direction computing unit 10 for computing direction of input motion direction information which is provided by the motion direction estimation value output unit 17, a motion direction histogram generating unit 11 for generating motion direction histogram with relation to the motion direction information which is computed by the motion direction computing unit 10, an accumulated motion direction histogram generating unit 14 for generating two-dimensional accumulated motion direction histogram in a predetermined sequence by using the motion direction histogram which is generated in the motion direction histogram generating unit 11, and a motion descriptor generating unit 6 for structuring (hierarchy structure) video into certain units according to a change amount of the accumulated motion direction histogram with the lapse of time, which is generated in the accumulated motion direction histogram generating unit 14, and generating a motion descriptor which describes motion characteristics with relation to the respective structured units.

Figure 1I:
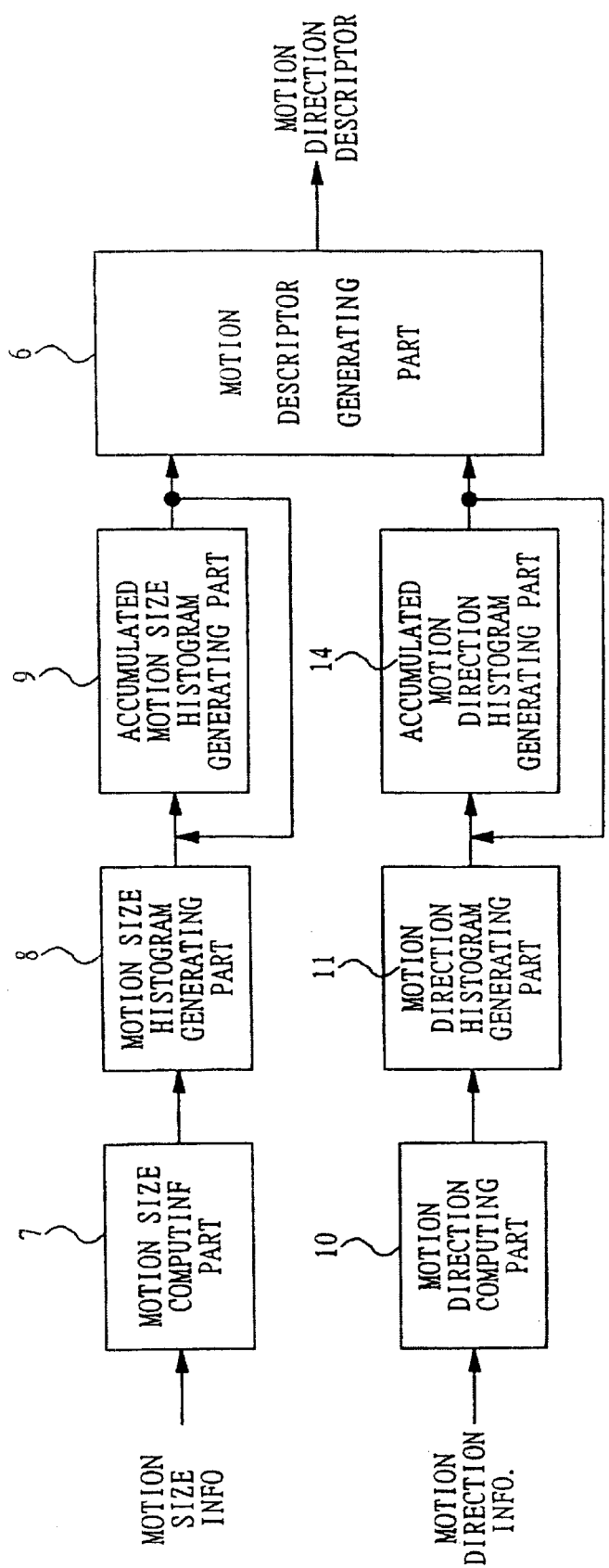

Referring to FIG. 1I, a motion descriptor generating apparatus by using accumulated motion histogram according to a preferred embodiment of the present invention includes a motion intensity computing unit 7 for computing intensity (degree) of input motion intensity information, a motion intensity histogram generating unit 8 for generating motion intensity histogram with relation to the motion intensity information which is computed by the motion intensity computing unit 7, an accumulated motion intensity histogram generating unit 9 for generating two-dimensional accumulated motion intensity histogram in a predetermined sequence by using the motion intensity histogram which is generated in the motion intensity histogram generating unit 8, a motion descriptor generating unit 9 for structuring (hierarchy structure) video into certain units according to a change amount of the accumulated motion intensity histogram with the lapse of time, which is generated in the accumulated motion intensity histogram generating unit 9, a motion direction computing unit 10 for computing direction of input motion direction information, a motion direction histogram generating unit 11 for generating motion direction histogram with relation to the motion direction information which is computed by the motion direction computing unit 10, an accumulated motion direction histogram generating unit 14 for generating two-dimensional accumulated motion direction histogram in a predetermined sequence by using the motion direction histogram which is generated in the motion direction histogram generating unit 11, and a motion descriptor generating unit 6 for structuring (hierarchy structure) video into certain units according to change amounts of the accumulated motion intensity and direction histograms with the lapse of time, which are generated in the accumulated motion intensity histogram generating unit 9 and the accumulated motion direction histogram generating unit 14, and generating motion descriptors which describe motion characteristics with relation to the respective structured units.

Figure 1J:
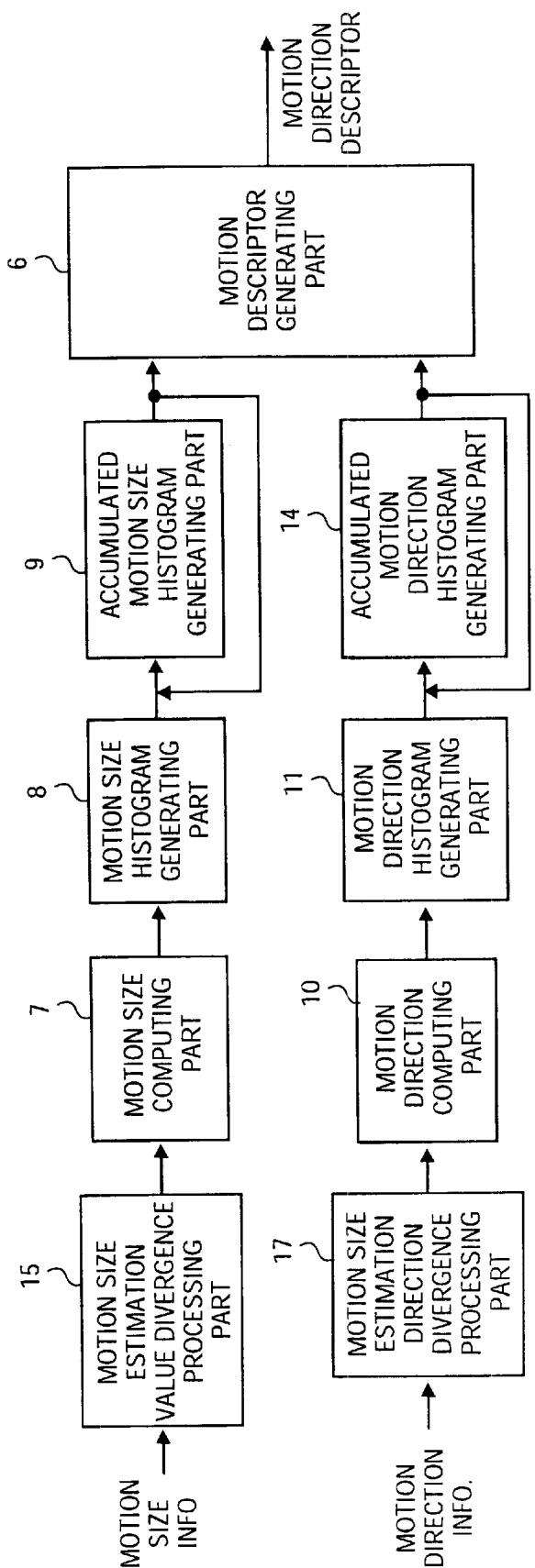

Referring to FIG. 1J, a motion descriptor generating apparatus by using accumulated motion histogram according to a preferred embodiment of the present invention includes an output unit 15 of motion intensity estimation value for processing to output a estimation value of motion intensity according to external frame selection mode, a motion intensity computing unit 7 for computing intensity (degree) of input motion intensity information which is provided from the motion intensity estimation value output unit 15, a motion intensity histogram generating unit 8 for generating motion intensity histogram with relation to the motion intensity information which is computed by the motion intensity computing unit 7, an accumulated motion intensity histogram generating unit 9 for generating two-dimensional accumulated motion intensity histogram in a predetermined sequence by using the motion intensity histogram which is generated in the motion intensity histogram generating unit 8, an output unit 17 of motion direction estimation value to provide the motion direction estimation value according to external frame selection mode, a motion direction computing unit 10 for computing direction of input motion direction information which is provided by the motion direction estimation value output unit 17, a motion direction histogram generating unit 11 for generating motion direction histogram with relation to the motion direction information which is computed by the motion direction computing unit 10, an accumulated motion direction histogram generating unit 14 for generating two-dimensional accumulated motion direction histogram in a predetermined sequence by using the motion direction histogram which is generated in the motion direction histogram generating unit 11, and a motion descriptor generating unit 6 for structuring (hierarchy structure) video into certain units according to change amounts of the accumulated motion intensity and direction histograms with the lapse of time, which are respectively generated in the accumulated motion intensity and direction histogram generating units 8 and 14, and generating motion descriptors which describes motion characteristics with relation to the respective structured units.

Figure 2:
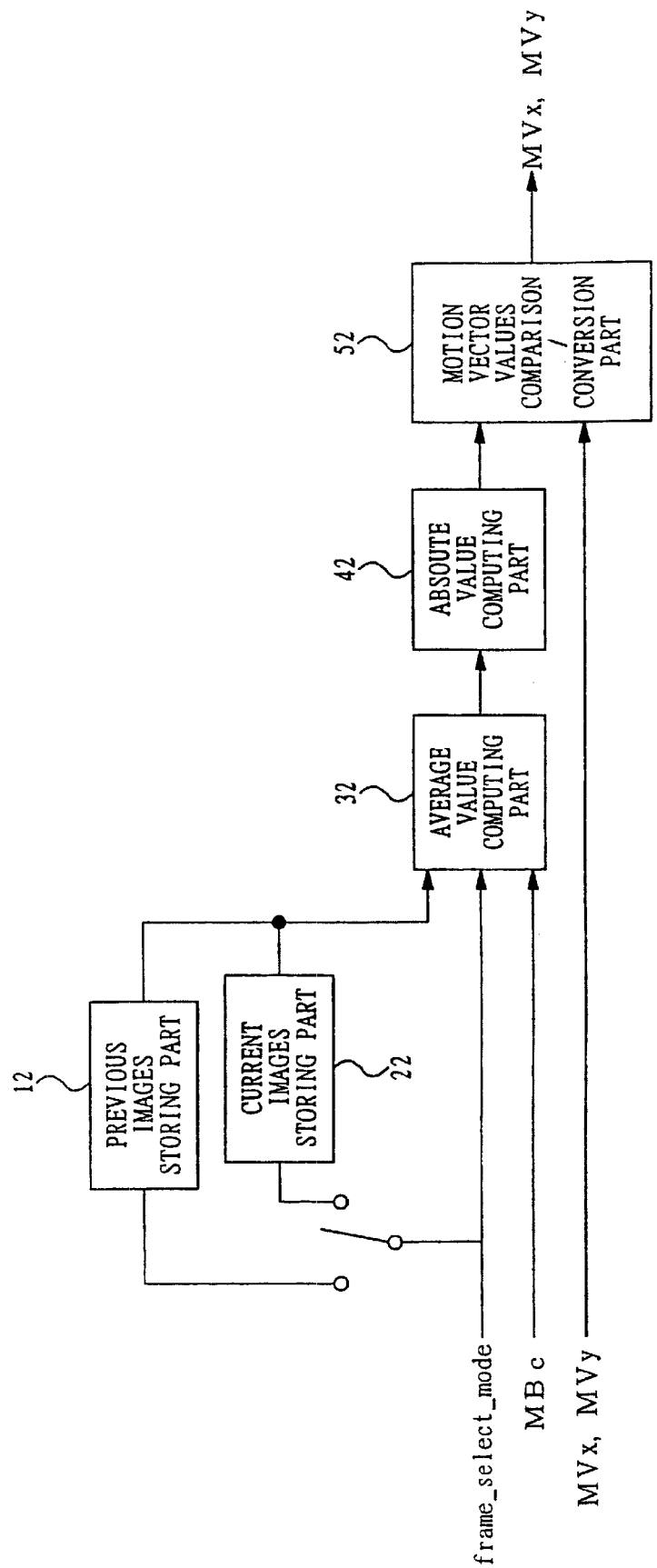
FIG. 2 is a schematic block diagram showing a motion estimation value divergence unit of FIG. 1B, FIG. 1D, FIG. 1F, FIG. 1G and FIG. 1J.

FIG. 2 is a schematic block diagram showing the motion estimation value divergence unit 2 of FIG. 1B, FIG. 1D, FIG. 1F, FIG. 1G and FIG. 1J.

As shown in FIG. 2, the motion estimation value divergence unit 2 includes a previous image storing unit 12 in which a previous image is stored in advance, a present image storing unit 22 for storing a present image, an average computation part 32 for computing respective averages between a present first area MBc which has a motion estimation value in a current input image, and a present second area to a present fourth area which are adjacent to and neighboring the present first area, which are stored in the present image storing unit 22, or between the present first area MBc and either one a previous first area which is stored at the same position with the present first area MBc in the previous image storing unit 12 or previous second to previous fourth areas neighboring the previous first area, an absolute value computation unit 42 for respectively computing differences between the present first area and the present second to fourth areas, or between the present first area, and the previous first area and the previous second to fourth areas, and computing respective absolute values of the obtained differences, and a motion vector values comparison/conversion part 52 for comparing the absolute values which are respectively computed in said absolute value computation unit 42, and converting X, Y motion vectors MVx, MVy which are input according to the comparison result to output motion vector values MVox, MVoy.

Figure 3:
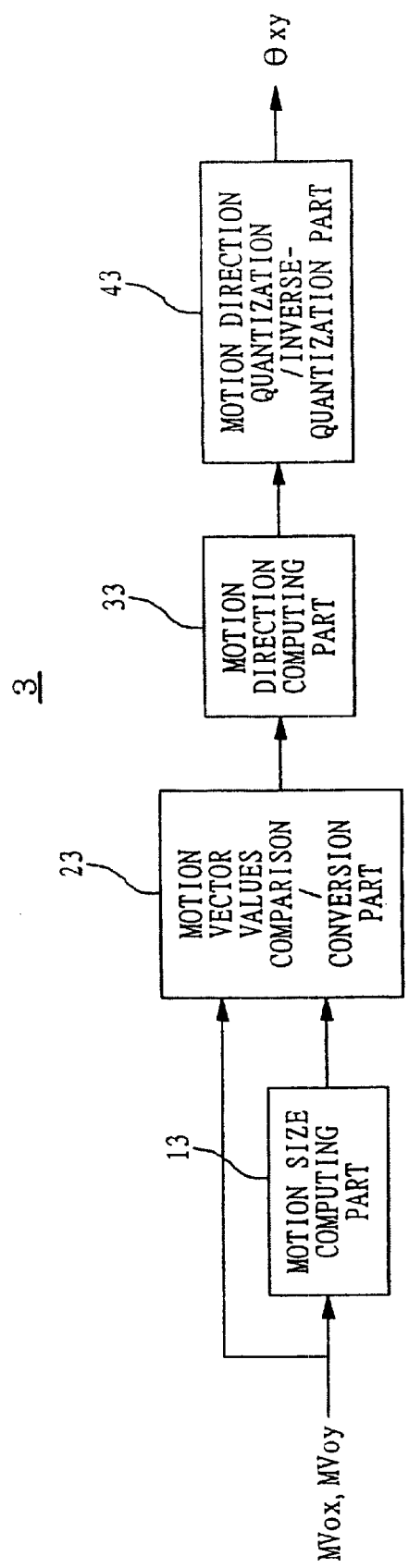
FIG. 3 is a detailed diagram showing a motion filter of FIG. 1C and FIG. 1D.

FIG. 3 is a detailed diagram showing motion filter 3 of FIG. 1C and FIG. 1D.

As shown in FIG. 3, the motion filter 3 includes a motion intensity computation part 13 for computing motion intensity by using the X,Y motion vector values MVox, MVoy which are processed by said motion estimation value divergence means 2, a motion vector value comparison/conversion part 23 for comparing motion intensity which is computed by said motion intensity computation part 13 with a predetermined threshold value and performing conversion of the motion vectors according to the comparison result, a motion direction computation part 33 for computing motion direction by using the motion vector values which are converted by the motion vector value comparison/conversion part 23, and a motion direction quantization/inverse-quantization part 43 for quantizing/inverse-quantizing motion direction which is computed by the motion direction computation part 33.

Figure 4:
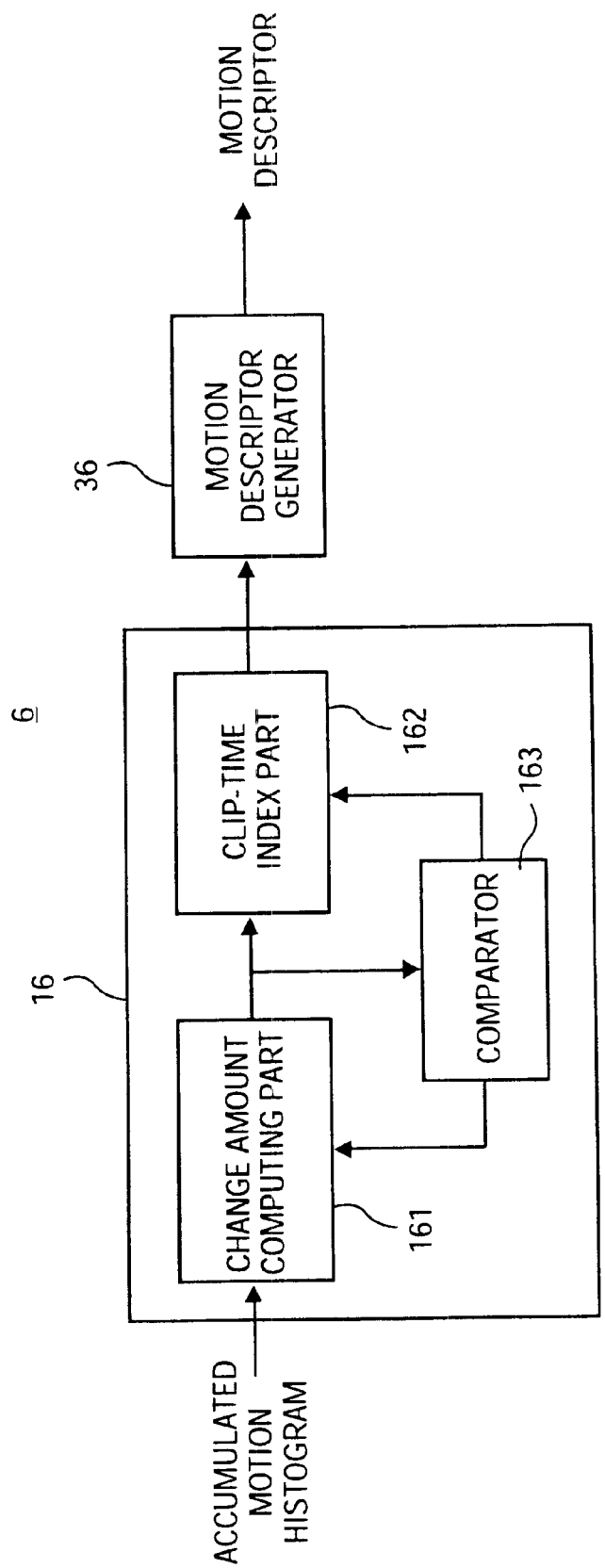
FIG. 4 is a detailed diagram showing a motion descriptor generating aprt of FIG. 1A to FIG. 1J.

FIG. 4 is a detailed diagram showing a motion descriptor generating part 6 of FIG. 1A to FIG. 1J.

As shown in FIG. 4, the motion descriptor generating part 6 includes a change amount computing part 161 for computing a change amount of accumulated motion histogram which is generated in the accumulated motion histogram generating unit 5, a clip-time index part 162 for generating a clip motion descriptor by indexing time change and clip numbers of the motion histogram which is computed in the part for computing a change amount of motion histogram 161, a comparison part 163 for comparing the change amount which is computed by the part for computing change amount of motion histogram 161 with a predetermined threshold value and enabling the part for computing the change amount of the motion histogram 161 or said clip-time index part 162, and a motion descriptor generation part 36 for generating a motion descriptor by using information which is described by the clip motion descriptor generated by the clip-time index part 162.

The clip-time index part 162 and the comparison part 163 operate only when the accumulated motion histogram, which is generated by the accumulated motion histogram generating part 5, is not structured. On the other hand, when the video is structured, the change amount of motion histogram, which is computed by the change amount computing part 161, is directely provided to the motion descriptor generating part 36.

The motion descriptor generating apparatus by using the accumulated motion histogram and a method therefor according to the preferred embodiments of the present invention as above will now be explained in more detail.

First, referring to FIG. 5, motion estimation procedure will be described on the basis of Block-Matching Algorithm BMA which is widely used in the current video compression standard.

The BMA requires previous and present images in order to perform motion search between images. Motion search unit is an area which is a so-called macro block MB comprised of 16×16 pixels. Therefore, after dividing current luminance images by MB unit, a position in the image for a data having a most similar MB luminance image data of the current MB is searched for in a motion search area Sr, which is defined in advance starting from a same position in a previous image with an MB to estimate in the present image (hereinafter, to be referred to "MBc"). And, the motion is indicated by difference vectors MVx, MVy which represent differences from the MB position in the present image, as shown in FIG. 4.

Usually, even though motion vectors for the current MB should be estimated by comparing all position data in the motion search area, this has a disadvantage that it takes too much time for the motion search. Therefore, in fact, more rapid motion search method such as 3-Step Search, Spiral Search, etc. are adopted. However, these methods have still a problem that it is not possible to guarantee optimum motion search always even though they can reduce the time required for motion search.

According to the conventional motion search methods, in case that all or some of image data are same in the motion search area, a plurality of positions in a motion search area may be selected, thereby disturbing precise motion search, which is called "divergence" in the motion search.

Figure 12A:
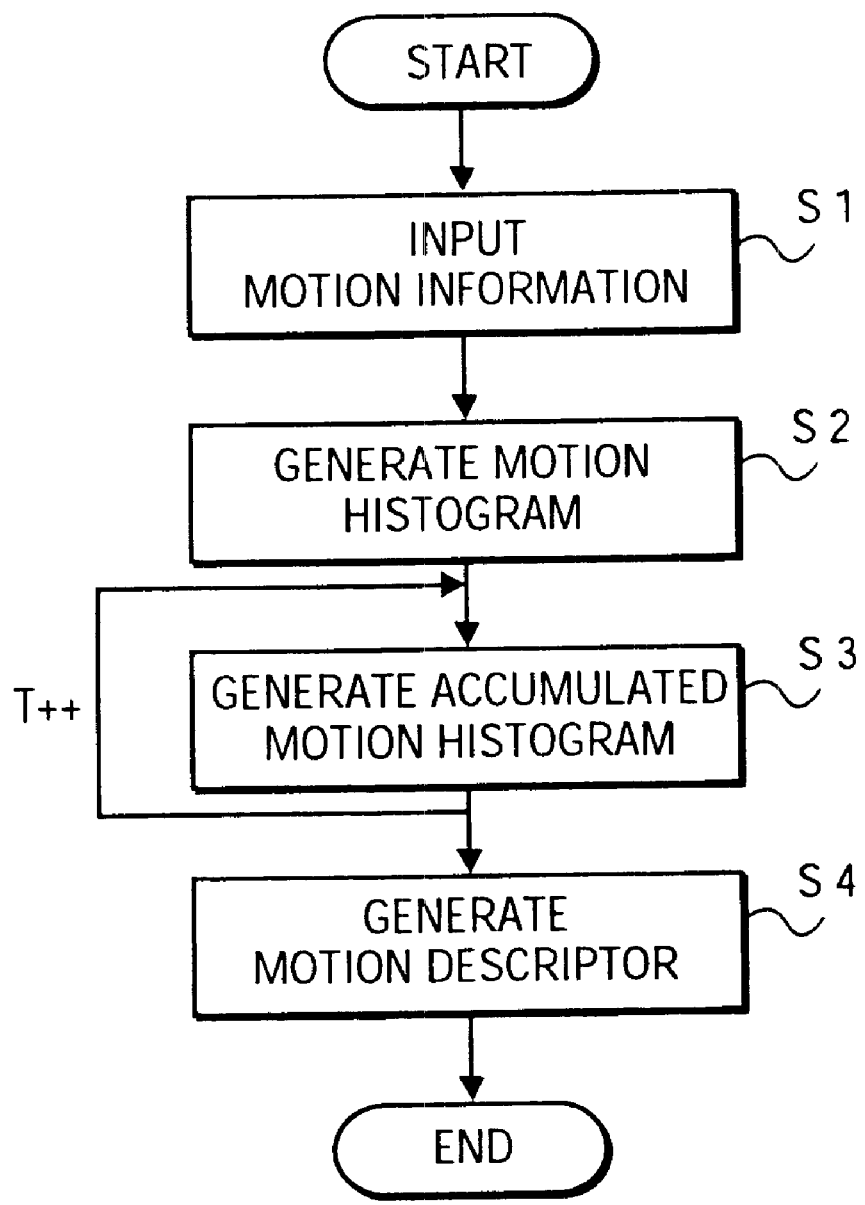
FIG. 12A to FIG. 12J are flow charts for explaining a method for generating motion descriptors by using accumulated motion histogram according to an embodiment of the present invention.
Figure 12B:
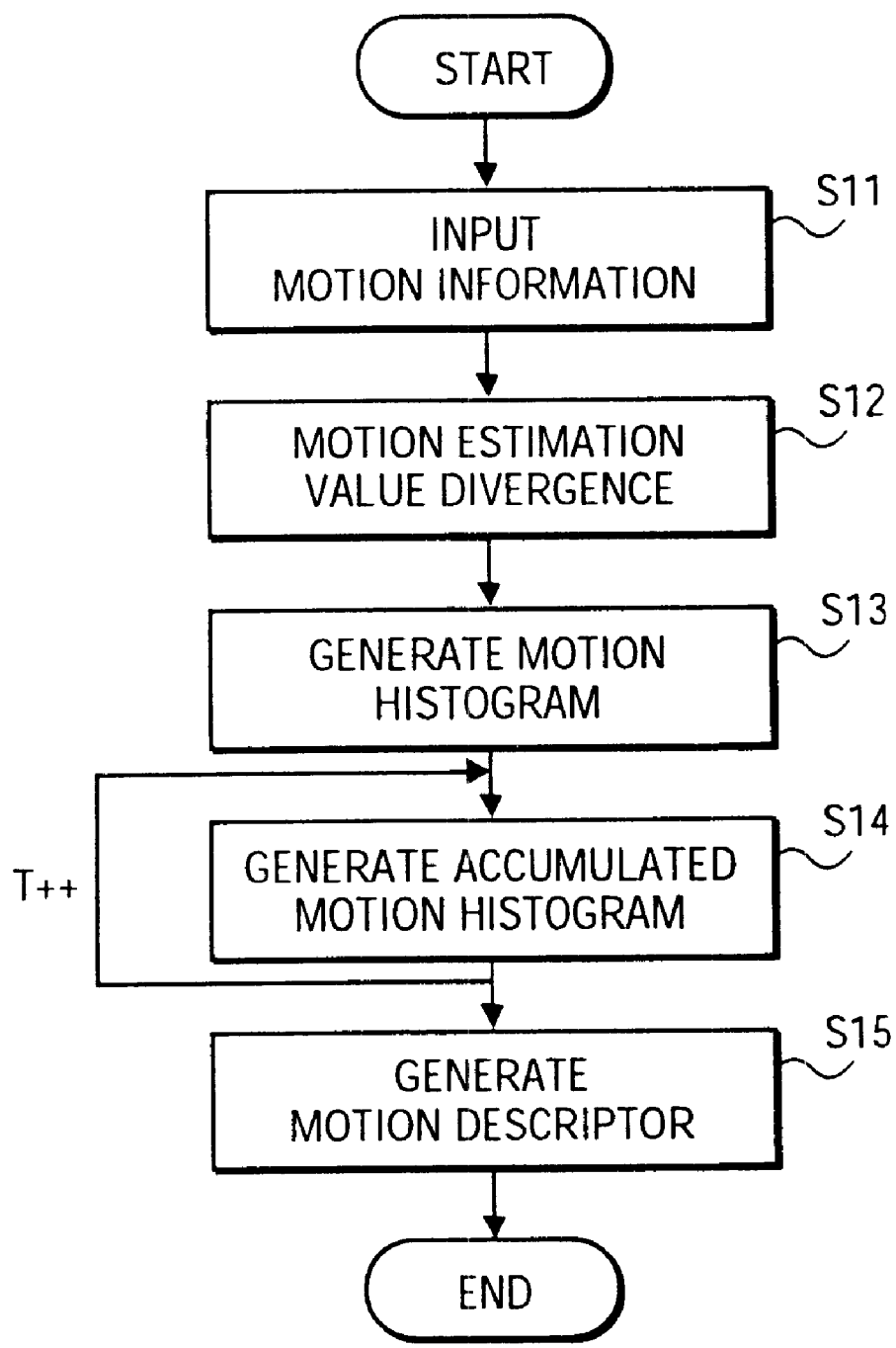
Figure 12C:
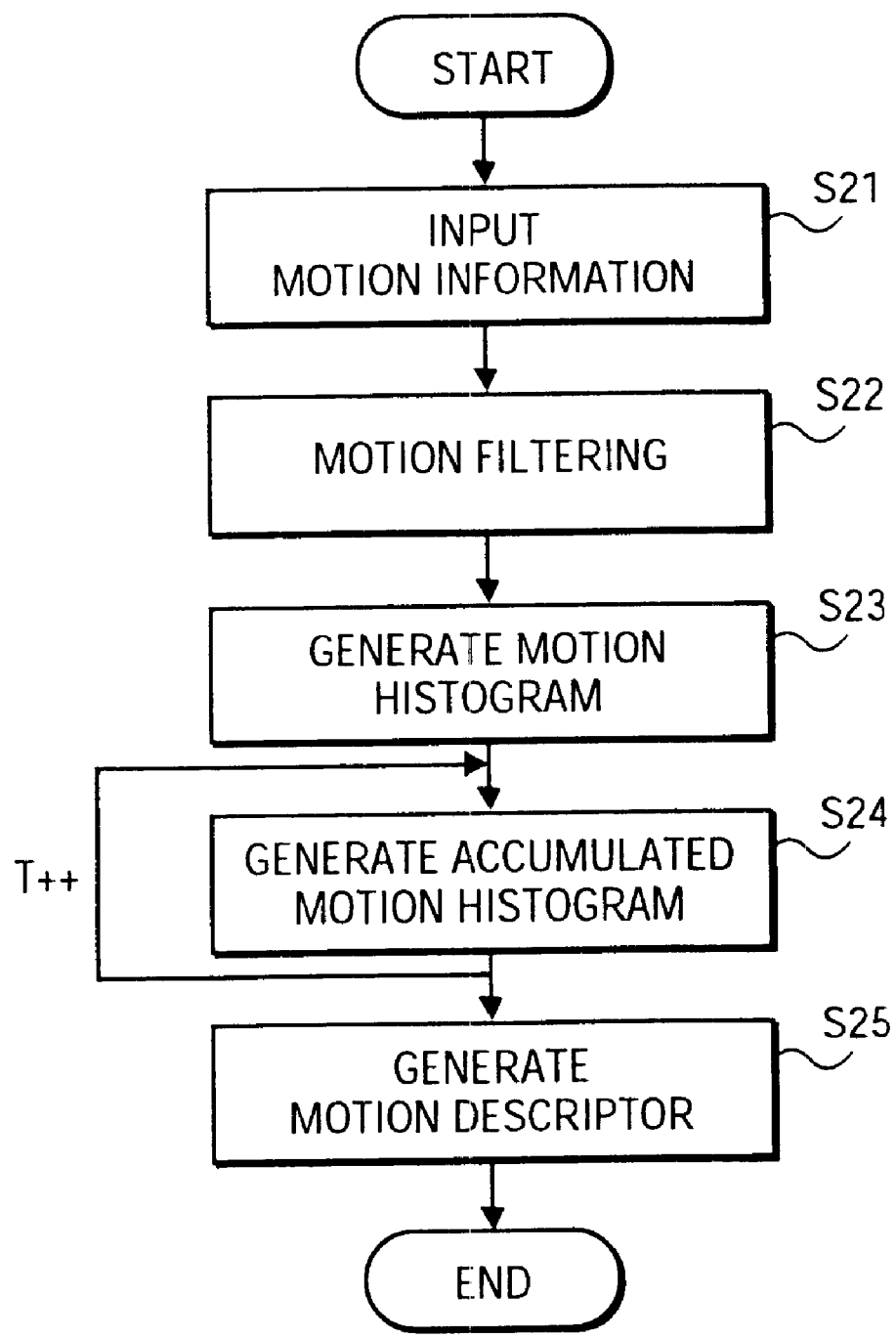
Figure 12D:
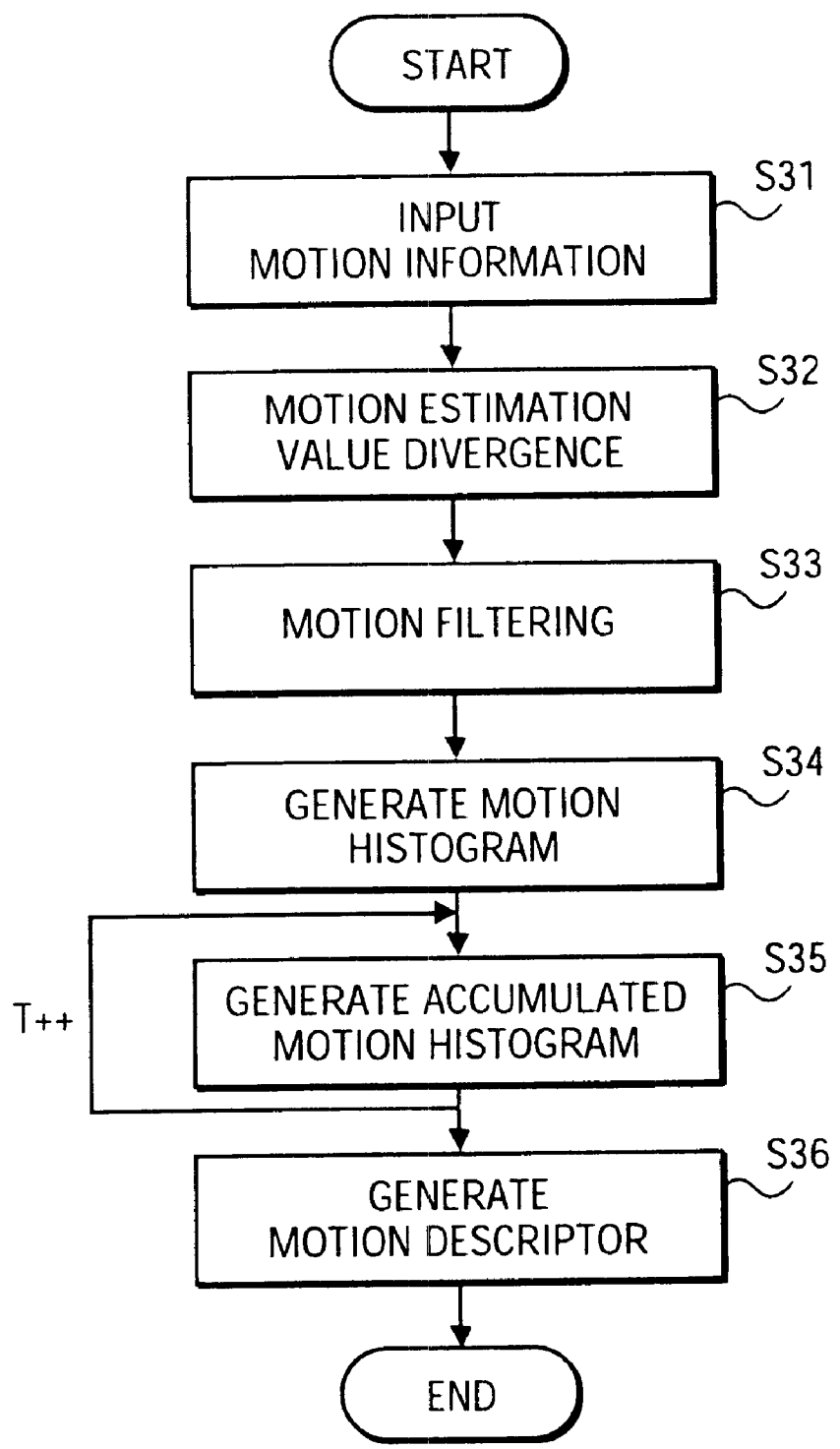
Figure 12E:
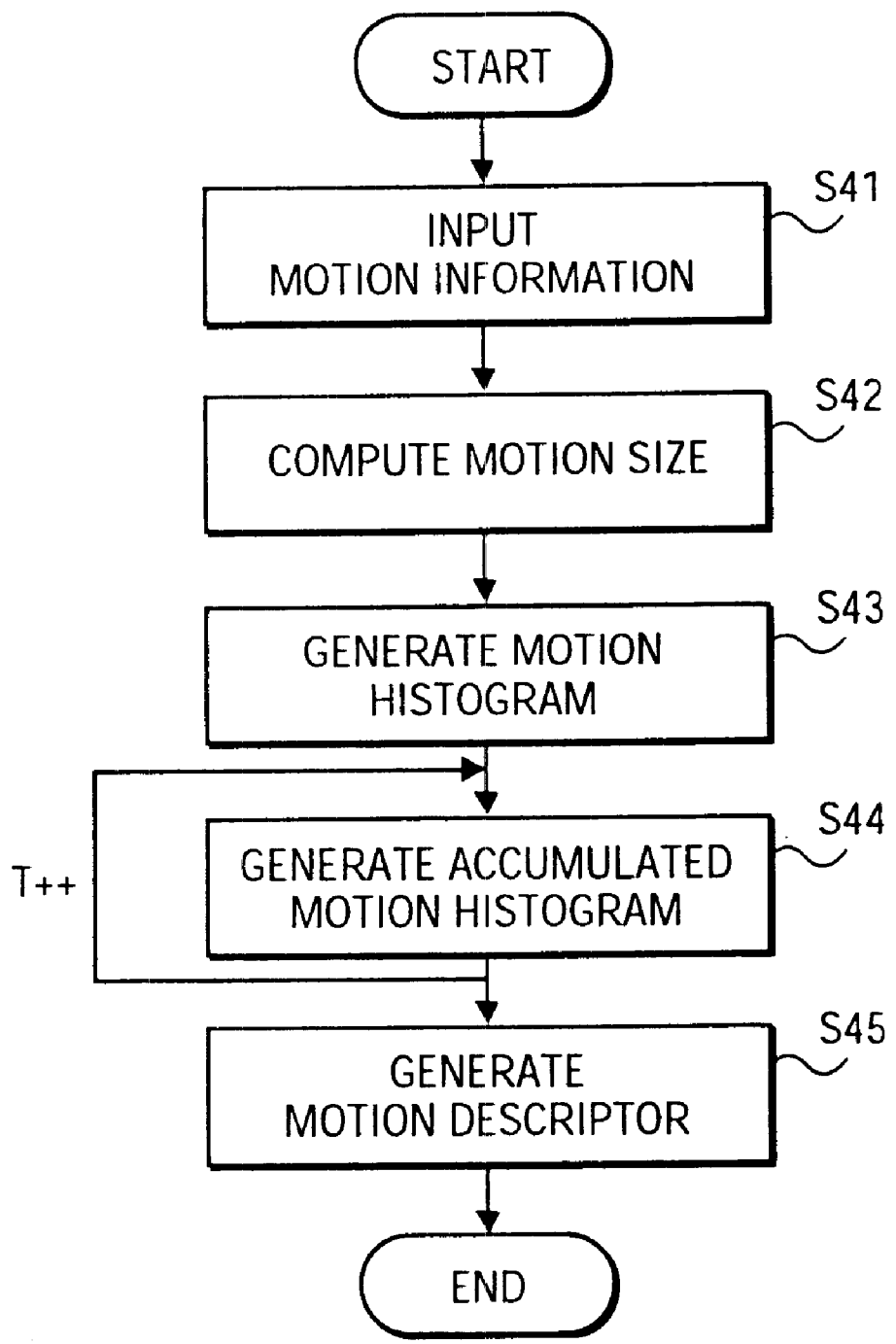
Figure 12F:
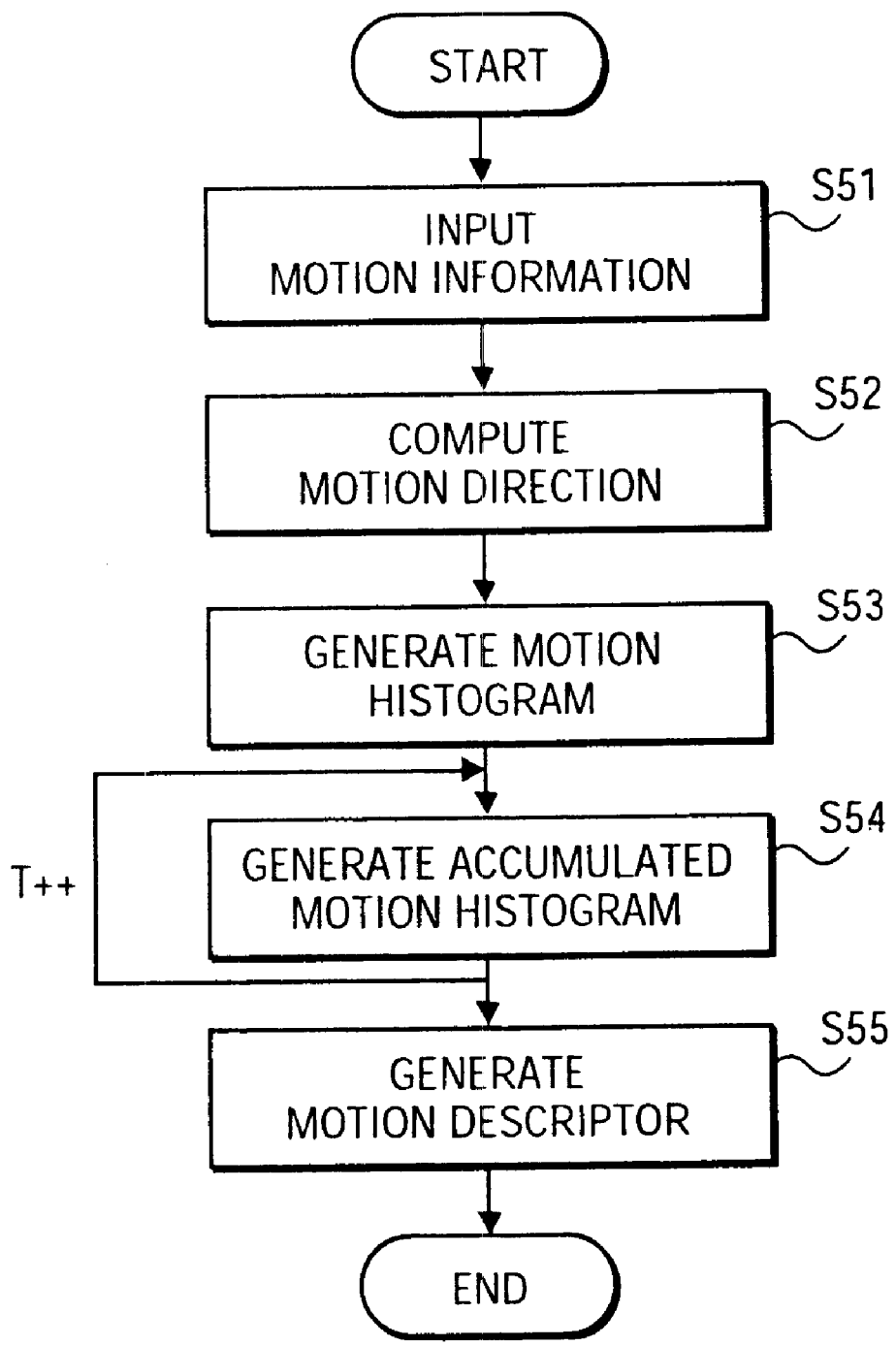
Figure 12G:
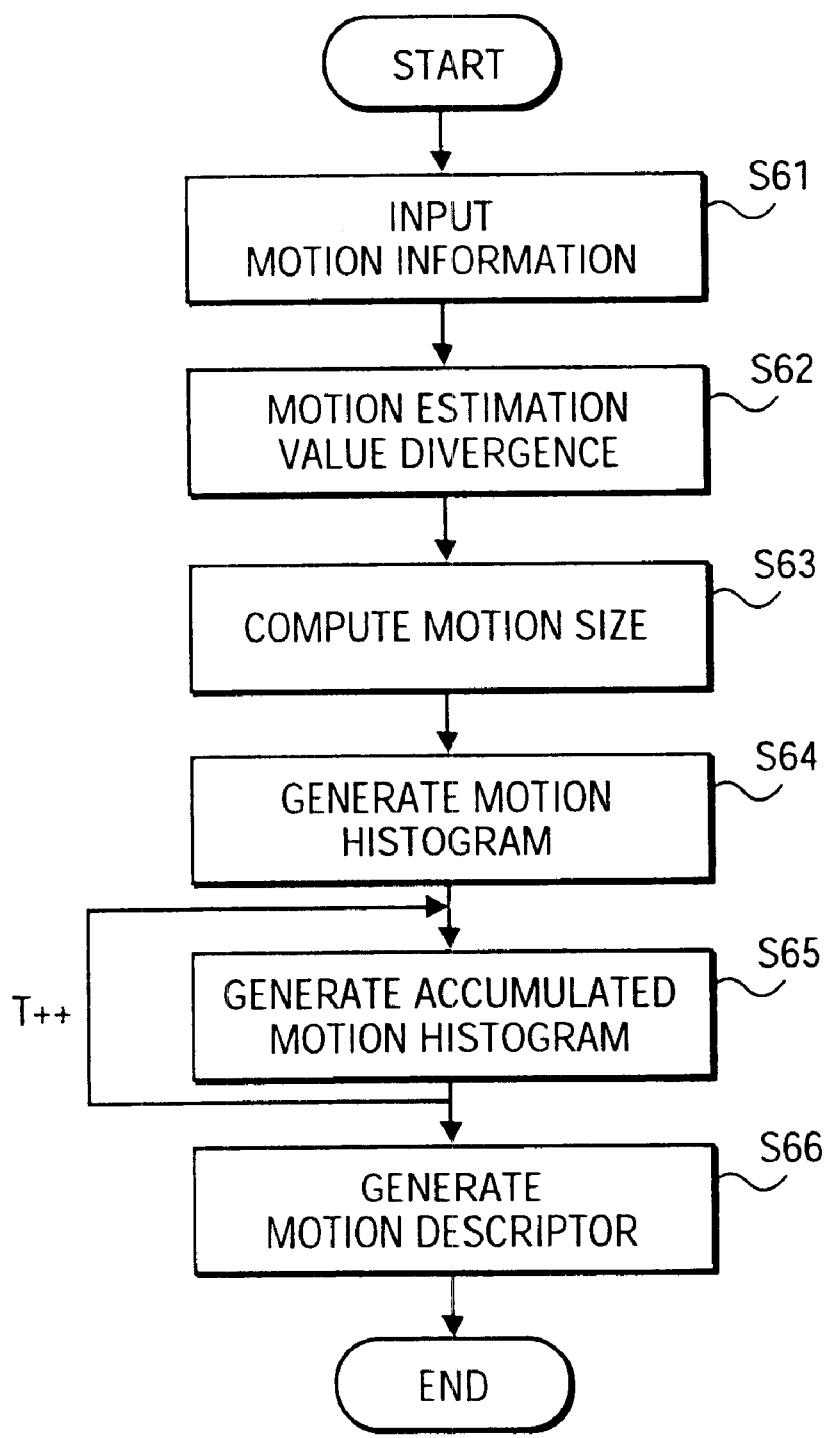
Figure 12H:
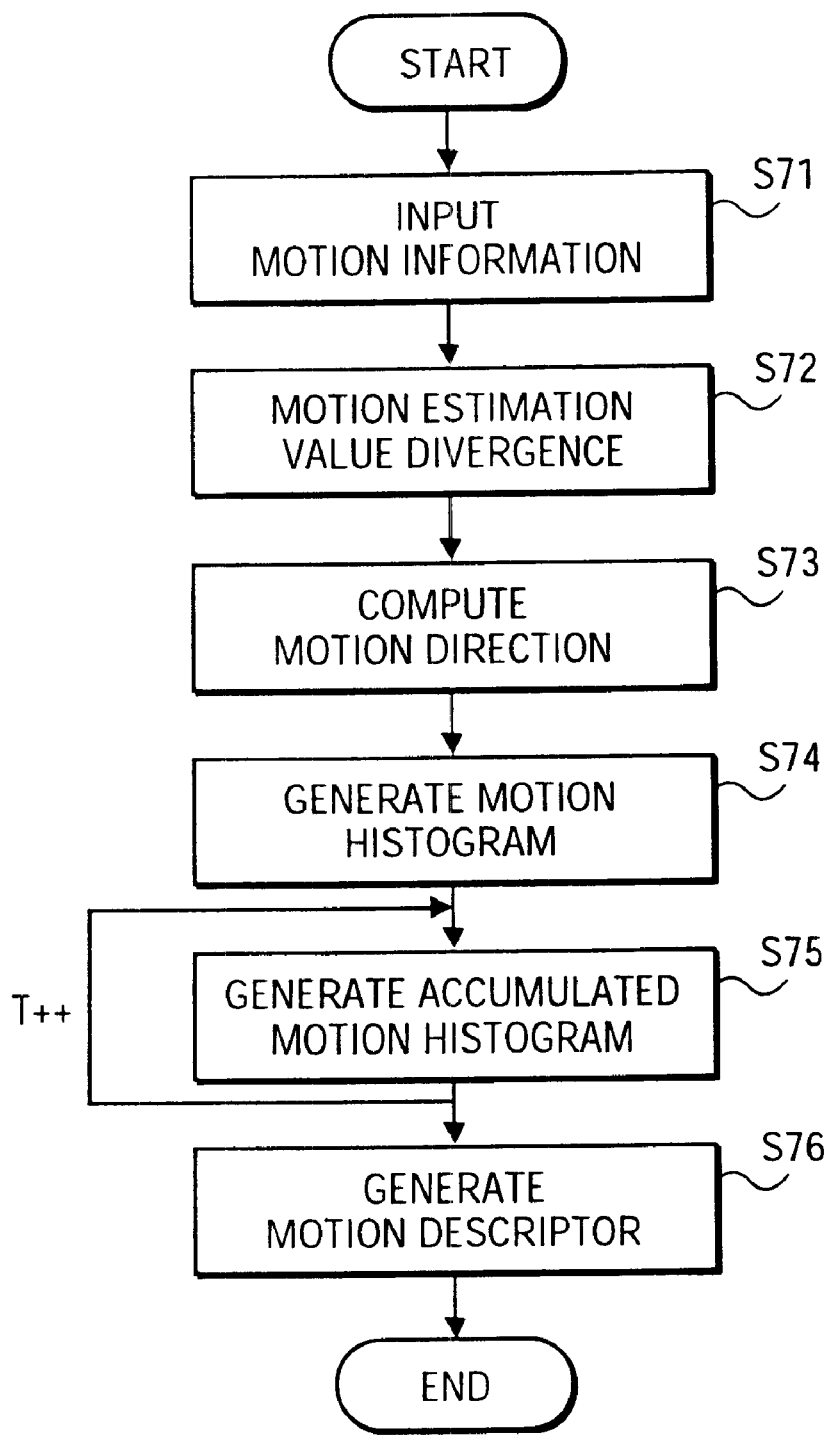
Figure 12I:
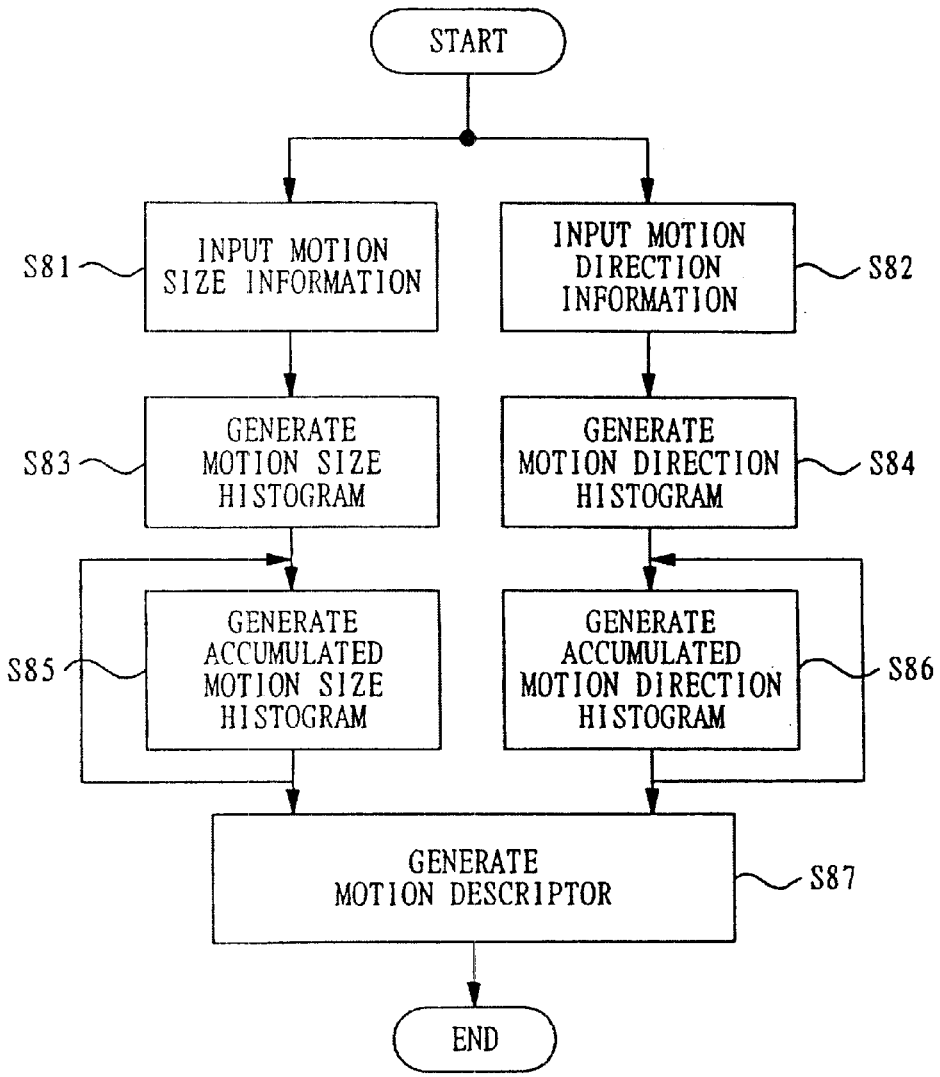
Figure 12J:
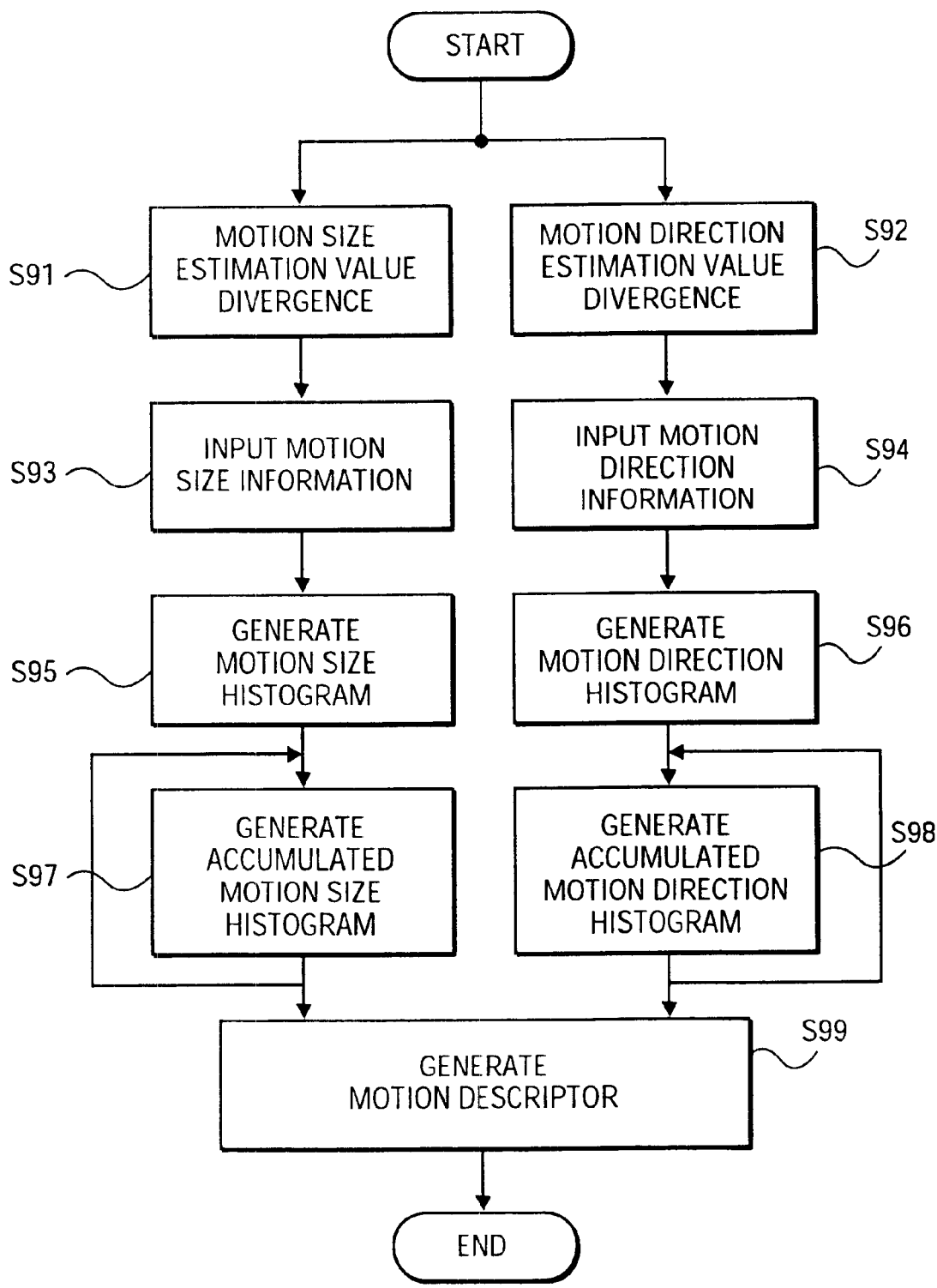

The operations of motion search value divergence part 2 as shown in FIG. 1B and FIG. 1D, the motion intensity search value divergence part 15 as shown in FIG. 1G, the motion direction search value divergence part 17 as shown in FIG. 1H and the motion intensity search value divergence part 15 and the motion direction search value divergence part 17 as shown in FIG. 1J, and the motion search value divergence step S12 and S32 as shown in FIG. 12B and FIG. 12D, the motion intensity search value divergence step S62 as shown in FIG. 12G, the motion direction search value divergence step S74 as shown in FIG. 12H and the motion intensity search value divergence step S91 and the motion direction search value divergence step S92 as shown in FIG. 12J are now explained in detail with reference to FIG. 2, FIG. 6A to FIG. 6C and FIG. 13.

FIG. 6A to FIG. 6C illustrate examples of the motion search value divergence, wherein FIG. 6A illustrates a case that the whole motion search area has a same pixel value, FIG. 6B illustrates a case that areas which have a same pixel value in a vertical direction are divided, and FIG. 6C illustrates a case that areas which have a same pixel value in a horizontal direction are divided.

In the above cases, the similarity is the same in any positions in the motion search area in FIG. 6A, the similarity is the same in the vertical positions in the motion search area in FIG. 6B, and the similarity is the same in the horizontal positions in the motion search area in FIG. 6A. Like this, if a plurality of position has the same similarity, precise motion search is impossible, which is the so-called divergence of motion search.

According to the present invention, two divergence method of motion search are suggested.

The first method adopts direct current of areas MB1, MB2 and MB3, which are neighboring an area MBc having an input motion search value in a present image. On the other hand, the second method adopts direct current of an area of a previous image which is in the same position with the area having an input motion search value in the present image, and its neighboring areas. The spatial relationship therebetween is as shown in FIG. 6.

According to the first method, even though it is impossible to precisely estimate whether a motion search value is diverged or not, it is possible to analyze characteristics of the previous image by using the current image instead of the previous image which is in fact used for the motion search, since a difference of time which is taken to obtain images between neighboring images is small and redundancy is large. Further, this method is suitable for application in which the whole previous images can not be stored due to the storage capacity. On the other hand, according to the second method, it becomes possible to measure whether the motion search value is diverged or not more precisely since information as to the previous images is adopted.

As above, the reason why using direct current of areas MB1, MB2, MB3, MBc, and MBp which have a motion search value corresponding to the estimated motion divergence is that the direct current value is the average value of the areas, representing the whole areas and being less sensitive to the local difference (noise) between the areas. The DC(Direct Current) is obtained by the following formula (1):

$$S = \sum_{i=0}^{N} P_i \quad (1)$$

$$DC = S/N$$

wherein, Pi represents a pixel value of ith pexel which has a motion search value, N represents the number of pixels in the area, S represents the sum of the whole pixels in the area, DC is the average of the pixel values in the area.

MBp represents an area in a previous image which has a same spatial position with MBc in the image. According to the frame_select_mode as shown in FIG. 2, MB1, MB2 and MB3 represent adjacent areas which are neighboring MBc in their spatial positions in the present or previous images. If the first divergence method is adopted (frame_select_mode is to be the present image selection mode), MB1, MB2 and MB3 correspond to the neighboring area of MBc. On the other hand, if the second divergence method is adopted (frame_select_mode is to be the previous image selection mode), MB1, MB2 and MB3 correspond to the spatially neighboring area of MBc in the previous image. According to the present invention, the motion search area Sr and the way to estimate are not particularly limited and may differ according to their application. The intensity of the area is not necessarily limited but it is advantageous to use the predetermined intensity for the sake of computation.

FIG. 2 is a schematic block diagram showing the motion search value divergence processing unit 2, which performs the divergence process of the motion search as described hereinabove.

Figure 13:
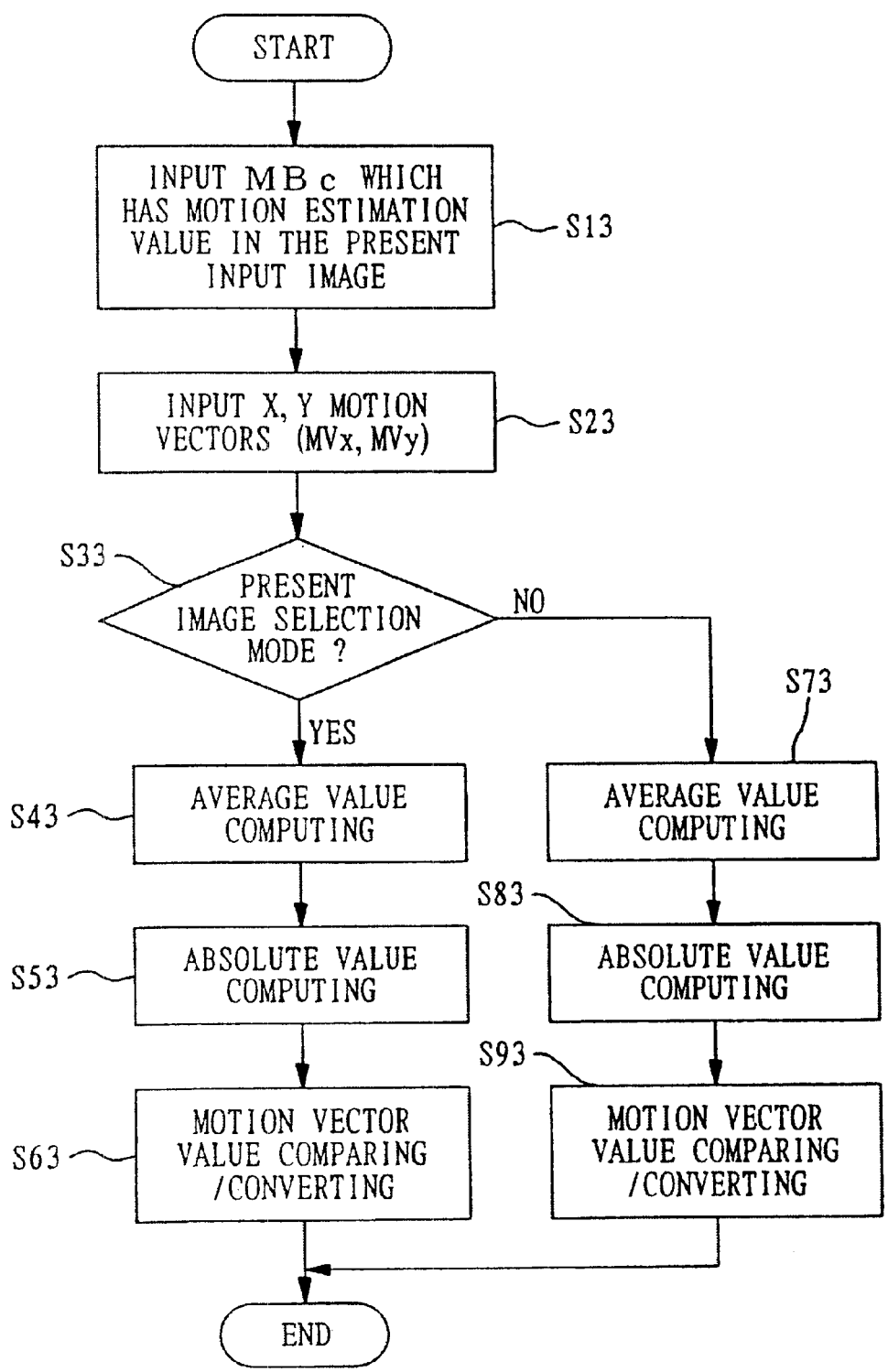
FIG. 13 is a detailed flow chart for explaining a motion estmiation value divergence step of FIG. 12B, FIG. 12D, FIG. 12G, FIG. 12H and FIG. 12J.

In FIG. 2, the frame_select_mode represents an external input mode for selecting images to use in the first or second method, and MVx and MVy respectively represent horizontal/vertical motion vectors which are estimated by the motion search part 1. If it is assumed that the DC values of MB1, MB2. MB3, MBc and MBp which are computed in the average computation part 32 are respectively MB1_DC, MB2_DC, MB3_DC, MBc_DC, and MBp_DC, the operation of the motion search value divergence part 2 of FIG. 2 and the motion search value divergence steps S13–S93 of FIG. 13 are described hereinbelow.

If the frame_select_mode is the current image selection mode, that is the first divergence processing method (S33), MB1_DC, MB2_DC, MB3_DC, and MBc_DC which are computed in the average computation part (32) is the average values which are obtained in the respective areas in the current image (S43).

First, if absolute values of the differences between MBc_DC and MB2_DC, and between MBc_DC and MB3_DC which are computed in the absolute value computation part 42 are smaller than a threshold value THO (S53), the motion vector value comparison/conversion part 52 regards that there is no motion and converts all the motion vector values MVox and MVoy into 0 (S63).

Second, if it is not correspond to the first case and the absolute value of the difference between MBc_DC and MB3_DC, which is computed in the absolute value computation part 42, is smaller than a threshold value THO (S53), the motion vector value comparison/conversion part 52 regards that there is no motion in the horizontal direction so that the motion vector value comparison/conversion part 52 converts the motion vector value MVox into 0 and outputs MVy without any conversion for the motion vector value NVoy (S63).

Third, if it is not correspond to the first and second cases and the absolute value of the difference between MBc_DC and MB2_DC, which is computed in the absolute value computation part 42, is smaller than a threshold value THO (S53), the motion vector value comparison/conversion part 52 regards that there is no motion in the vertical direction so that the motion vector value comparison/conversion part 52 converts the motion vector value NVoy into 0 and outputs MVx without any conversion for the motion vector value MVox (S63).

Fourth, if it is not correspond to any one of the first to the third cases, the motion vector value comparison/conversion part 52 regards that no motion search value is diverged and outputs MVx and MVy without any conversion of MVox and MVoy (S63).

On the other hand, If the frame_select_mode is the previous image selection mode, that is the second divergence processing method, MBc_DC which is computed in the average computation part 32 is the average values which are obtained in the respective areas in the current image and the respective area in the previous images MBp_DC, MV1_DC, MB2_DC, and MB3_DC (S73).

First, if absolute value of the difference between MBp_DC and MBc_DC, which is computed in the absolute value computation part 42, is smaller than a threshold value THO (S83), the motion vector value comparison/conversion part 52 regards that there is no motion so that the motion vector value comparison/conversion part 52 converts all the motion vector values MVox and MVoy into 0 (S93).

Second, if it is not correspond to the first case and the absolute values of the differences between MBc_DC and MB2_DC and between MBc_DC and MB3_DC which are computed in the absolute value computation part 42 are smaller than a threshold value THO (S83), the motion vector value comparison/conversion part 52 regards that there is no motion so that the motion vector value comparison/conversion part 52 converts all the motion vector values MVox and MVoy into 0 (S93).

Third, if it is not correspond to the first and second cases and the absolute value of the difference between MBc_DC and MB3_DC, which is computed in the absolute value computation part 42, is smaller than a threshold value THO (S83), the motion vector value comparison/conversion part 52 regards that there is no motion in the horizontal direction so that the motion vector value comparison/conversion part 52 converts the motion vector value MVox into 0 and outputs MVy without any conversion for the motion vector value MVoy (S63).

Fourth, if it is not correspond to any one of the first to third cases and the absolute value of the difference between MBc_DC and MB2_DC which is computed in the absolute value computation part 42 is smaller than a threshold value THO (S83), the motion vector value comparison/conversion part 52 regards that no motion in the vertical direction so that the motion vector value comparison/conversion part 52 converts the motion vector value MVoy into 0 and outputs MVx without any conversion of MVox (S63).

Fifth, if it is not correspond to any one of the first to the fourth cases, the motion vector value comparison/conversion part 52 regards that no motion search value is diverged and outputs MVx and MVy without any conversion of MVox and MVoy (S93).

If the absolute values of the DC differences are smaller than the threshold values, the possibility that the images of the motion search of MVx, MVy are thoroughly, horizontally, or vertically same or almost same with that of MBc (no motion occurs) even though motion vectors exist. Therefore, in the divergence processing methods as above, the motion search values are deemed to be incorrect and the differences of MBC_DC from MBp_DC, MV1_DC, MB2_DC, and MB3_DC are utilized so that the above two divergence proessing methods are alternatively performed.

Figure 14:
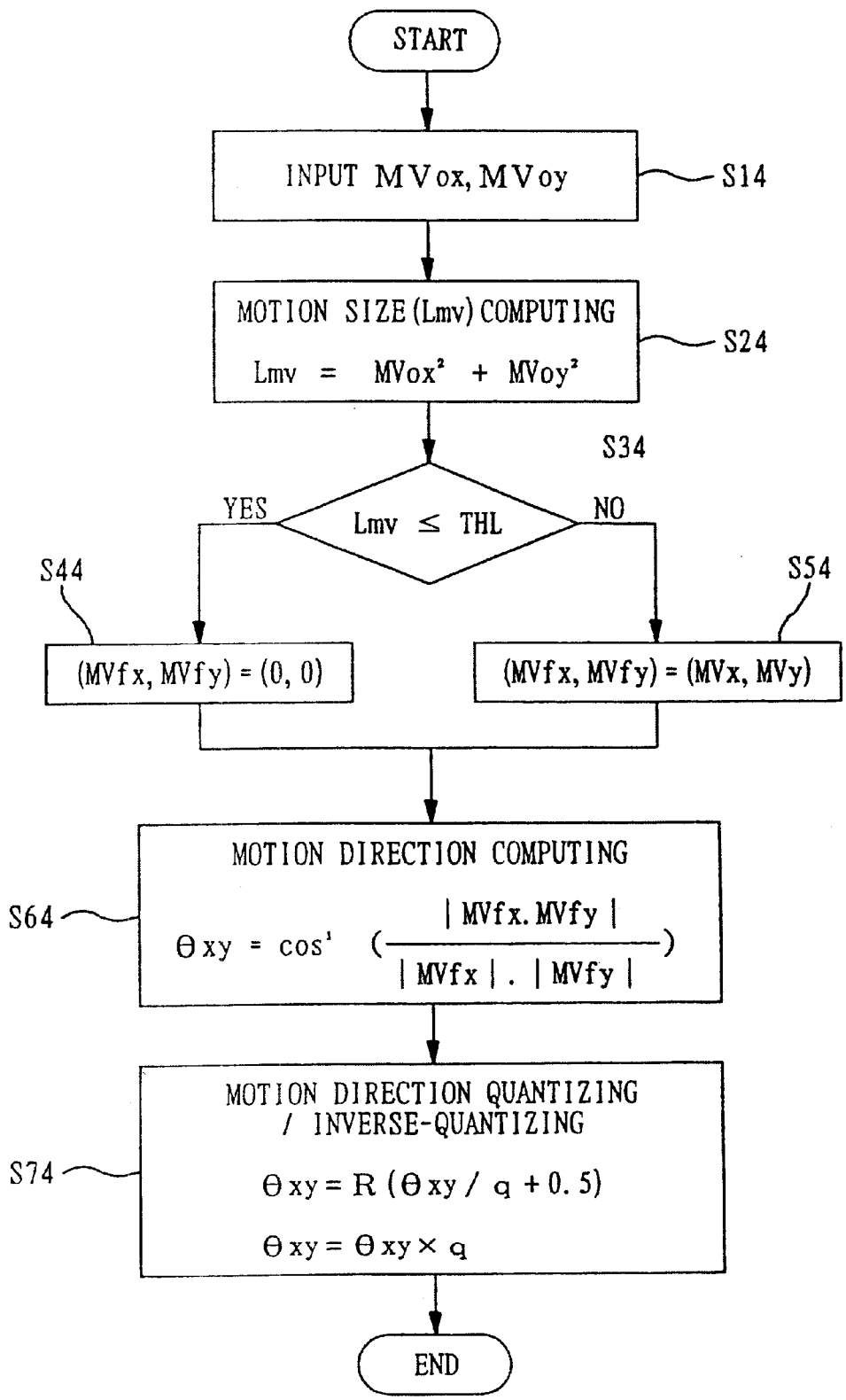
FIG. 14 is a flow chart for explaining intensity and direction of motion and filtering process considering visual characteristics in FIG. 12C and FIG. 12D.

Next, the operation of the motion filter 3 as shown in FIG. 1C and FIG. 1D and the motion filtering steps (S22), (S33) as shown in FIG. 12C and FIG. 13D will be described in detail with reference to FIG. 3 and FIG. 14.

The motion filtering is performed to reflect human perception and extract dominant motion in the image, for thereby improving the subjective similarity with relation to motion. Therefore, the motion filtering has an object to reduce data amount to express motions by properly using visual limitation.

Now, the motion intensity filtering steps (S14–S54) are explained in detail with reference to in FIG. 14.

When the motion vector values MVox, MVoy, which are generated in the motion search value divergence processing part 2, are input (S14), the motion intensity computation part 13 obtains the motion intensity Lmv by using the formula (2) (S11):

$$Lmv = \sqrt{MVox^2 + MVoy^2}$$

$$Lmv = R(Lmv/P)$$

$$L_{mv} = (L_{mv}/p),\ p \geq 1 \tag{2}$$

wherein, p is the quantization factor of intensity.

If the computed motion intensity Lmv is smaller than a threshold value THL (S34), the motion vector comparison/conversion part 23 regards that there is a motion in the image which is a too small intensity to visualize or random noise occurs in the image during image obtaining or processing, so that the motion vector comparison/conversion part 23 converts all estimated motion values MVfx and MVfy into 0 (S44).

On the other hand, if the computed motion intensity Lmv is larger than the threshold value THL, the motion vector comparison/conversion part 23 converts the motion vector values Mvx, MVy into all estimated motion values MVfx and MVfy (S54).

This is, as stated in the conventional techniques, because the subjective similarity is the principal factor to affect the performance of the multimedia data search. The threshold value of the intensity filtering (THL) may be computed experimentally or statistically according to the human visual characteristics or the characteristics of application fields.

Now, the motion direction filtering is explained in detail.

The motion direction filtering has an object to reduce data amount to express motions by properly using visual limitation, in the same manner with the motion intensity filtering step.

In the reflection of visual limitation on the motion, the motion direction computation part 33 computes motion direction data θxy by using the motion vector values MVfx, MVfy which are converted in the motion vector value comparison/conversion part 23, which is obtained by the formula (3)

$$\theta xy = \cos^{-1}\left(\frac{|MVfx \cdot MVfy|}{|MVfx| \cdot |MVfy|}\right) \quad (3)$$

The motion direction quantization/inverse-quantization part 43 performs direction quantization/inverse-quantization with relation to the direction data θxy, which is computed in the motion direction computation part 33, before generating histogram, which is obtained by the formula (4):

$$\theta xy = R(\theta xy/q)$$

$$\theta xy = \theta xy \times q, \quad q \geq 1 \quad (4)$$

wherein, q is the quantization factor of direction, θxy is the direction values MVfx, MVfy and R(x) is an integer which is not larger than x.

Figure 8:
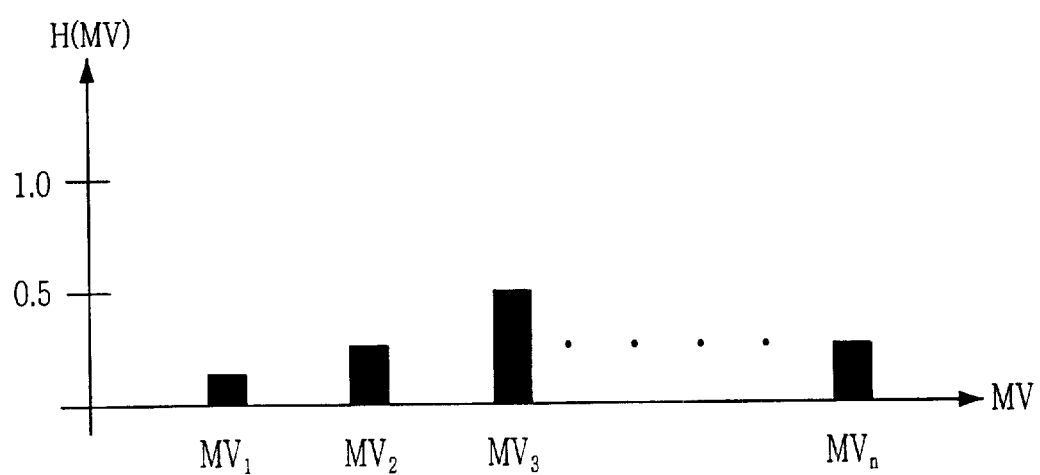
FIG. 8 is a graph for explaining motion histogram with relation to motion direction data which are generated in the motion histogram generating unit of FIG. 1A to FIG. 1J.

Now, the operations of the motion histogram generating part 4 as shown in FIG. 1A to FIG. 1D, the motion intensity histogram generating part 8 as shown in FIG. 1E and 1G, the motion direction histogram generating part 11 as shown in FIG. 1F and FIG. 1H, and the motion intensity histogram generating part 8 and the motion direction histogram generating part 11 as shown in FIG. 1I and FIG. 1J, and motion histogram generating steps (S2, S13, S23, S42) as shown in FIG. 12A to FIG. 12D, the motion intensity histogram generating steps (S43, S64) as shown in FIG. 12E and FIG. 12G, the motion direction histogram generating steps (S53, S74) as shown in FIG. 12F and FIG. 12H, and the motion intensity histogram generating steps (S83, S95) and the motion direction generating steps (S84, S96) as shown in FIG. 12I and FIG. 12J will be explained in detail with reference to FIG. 8.

Since the histogram may express the whole statistic characteristics of data to analyze by using 3-D hierarchy structure, it is widely used in the fileds of the image signal process or pattern recognition. According to the present invention, the histogram is utilized to describe the statistic characteristics of motions.

According to the present invention, a histogram is suggested that motion information of video contents such as motion direction θxy, motion intensity Lmv and other parameters indicating other characteristics of the motion are divided into groups of bin by using the quantization/inverse-quantization of the filtering methods or other general methods and represents frequency that information corresponding to each group, which is obtained by the formula (5):

$$H(MVi) = SMVi/M \quad (5)$$

wherein, $\Sigma H(MV_i) = 1.0$, $M = \Sigma SMV_i$

SMVi is the sum of frequency that ith group of motion information to express by histogram is generated, M is the sum of frequency that motion data to express by histogram is generated, and H(MVi) is a probability that motion information of ith group happens. The SMV represents motion direction, motion intensity and parameters except for motion direction and motion intensity.

By using the motion histogram, the whole and characteristic motion flow and pattern may be analyzed and expressed. FIG. 8 shows motion histogram for motion direction, wherein as the thickness of a line becomes thicker, the number of areas having the motion in a corresponding direction becomes larger. Therefore, 2-D motion histogram of FIG. 8 may be preferably used to describe each representative image in a structured video or the whole statistic characteristics for video clip. However, since 2-D motion histogram is impossible to express detail flow of motion information in the video clip, the motion characteristics will be described by using the 3-D accumulated histogram as shown in FIG. 9 in the present invention.

Figure 9:
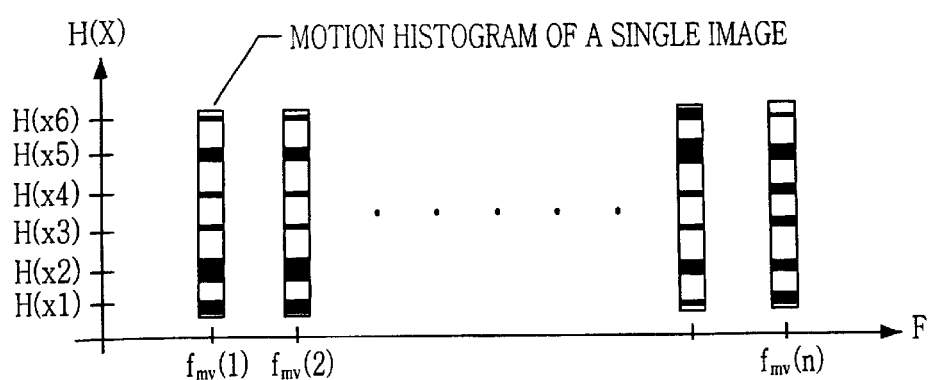
FIG. 9 is a graph for explaining accumulated histogram with relation to accumulated motion direction data which is generated in the accumulated motion histogram generating unit of FIG. 1A to FIG. 1J.
Figure 10:
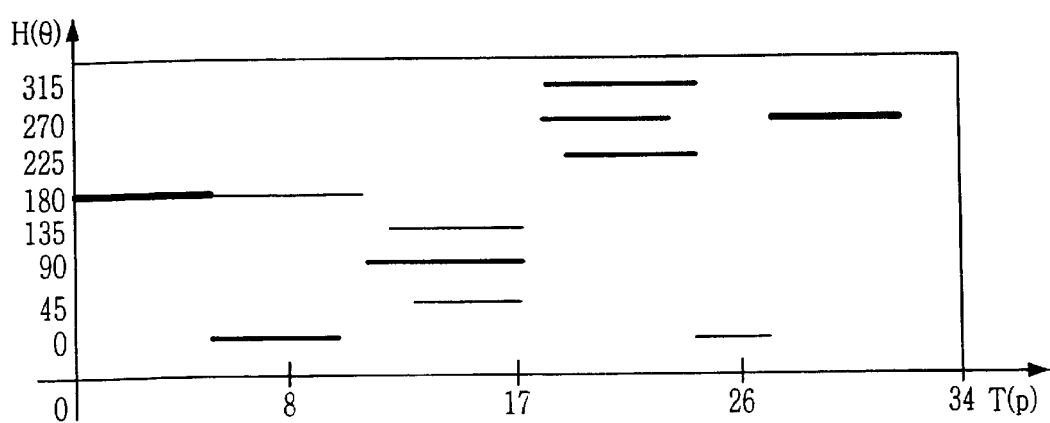
FIG. 10 is an illustrative view for showing accumulated motion histogram with relation to a video comprising 35 images which are accumulated in the accumulated motion histogram generating unit of FIG. 1A to FIG. 1J.

Now, the operations of the accumulated motion histogram generating part 5 as shown in FIG. 1A to FIG. 1D, the accumulated motion intensity histogram generating part 9 as shown in FIG. 1E and 1G, the accumulated motion direction histogram generating part 14 as shown in FIG. 1F and FIG. 1H, and the accumulated motion intensity histogram generating part 9 and the accumulated motion direction histogram generating part 14 as shown in FIG. 1I and FIG. 1J, and accumulated motion histogram generating steps (S3, S14, S24, S35) as shown in FIG. 12A to FIG. 12D, the accumulated motion intensity histogram generating steps (S44, S65) as shown in FIG. 12E and FIG. 12G, the accumulated motion direction histogram generating steps (S54, S75) as shown in FIG. 12F and FIG. 12H, and the accumulated motion intensity histogram generating steps (S85, S97) and the accumulated motion direction generating steps (S86, S98) as shown in FIG. 12I and FIG. 12J will be explained in detail with reference to FIG. 9 and FIG. 10.

The accumulated motion histogram generating part 5, the accumulated motion intensity generating part 9 and the accumulated motion direction histogram generating part 14 generates 3-D motion histogram by accumulating the motion histogram in a predetermined sequence and utilize it for expressing motion characteristics of video, which is referred to "accumulated motion histogram" in the present invention. FIG. 9 illustrates a shape of the accumulated motion histogram. In FIG. 9, fmv represents motion infomration such as motion intensity and motion direction of respective images, F={fmv(1), . . . , fmv(n)} represents a image set which has a certain amount of motion information. H(x) corresponds to a motion histogram value of the respective motion information, which is the bin value of accumulated histogram.

In the generation of the accumulated motion histogram, which motion information is utilized and what is utilized as a basis of y axis in the accumulation depends on its applications.

Figure 7:
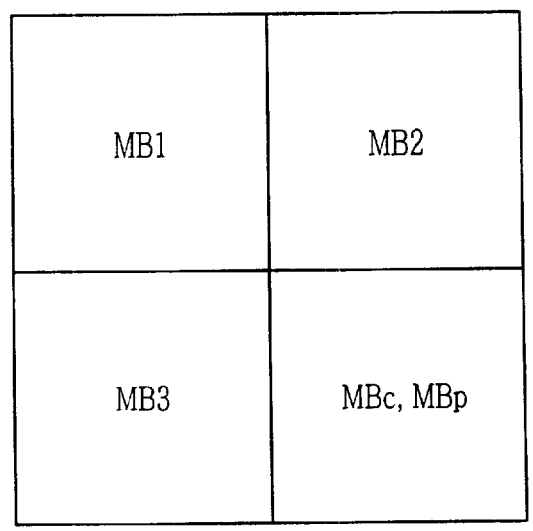
FIG. 7 is a view showing a spatial relationship between a current area and a neighboring area for explaining motion estimation value divergence in the motion estimation value divergence unit.

The accumulated motion histogram may properly reflect the human visual characteristics by using the motion filtering method which has been suggested by this invention, and it is possible to express motion flow and pattern during the whole video or a specific time duration by using a small amount of motion characteristics information. For example, FIG. 10 illustrates an accumulated motion histogram which is generated by applying the motion filtering (q of FIG. 7B is set to 45°) to the motion direction information, when a video is comprised of 35 images for a scene that people and cars are moving on a quiet street and continuous explosion occurs on earth and in the sky by some reason, local movement of people happens to avoid the explosion and further explosion occurs.

Wherein, x axis represents temporal positions, and y axis represents motion direction information for the respective images. In the above scene which has such complicated motions, the flow and pattern of the whole motions of the scene may be clearly and apparently expressed by using the accumulated motion histogram, as shown in FIG. 8.

As above, since, in general, video is comprised of many images, the motion histogram and data amount of the accumulated motion histogram increase proportionally to express the motion characteristics of respective images into 3-D. Also, the time which is required for research increases. In order to properly resolve these problems, the present invention includes the motion description method by using the above histogram and suggests a motion descriptor generation method for describing motion characteristics corresponding to the various steps of search (Search/Retrieval from Coarse to Fine Level). The suggested motion descriptor is comprised of multi-steps and the search steps may be selected by users according to the application fields.

The operation of the motion descriptor generating part 6 as shown in FIG. 1A to FIG. 1J and the motion descriptor generating steps (S4), (S15), (S25), (S36), (S45), (S55), (S66), (S76), (S87) and (S99) as shown in FIG. 12A to FIG. 12J will be described in more detail with reference to FIG. 4, FIG. 11, FIG. 15A and FIG. 15B.

Figure 15A:
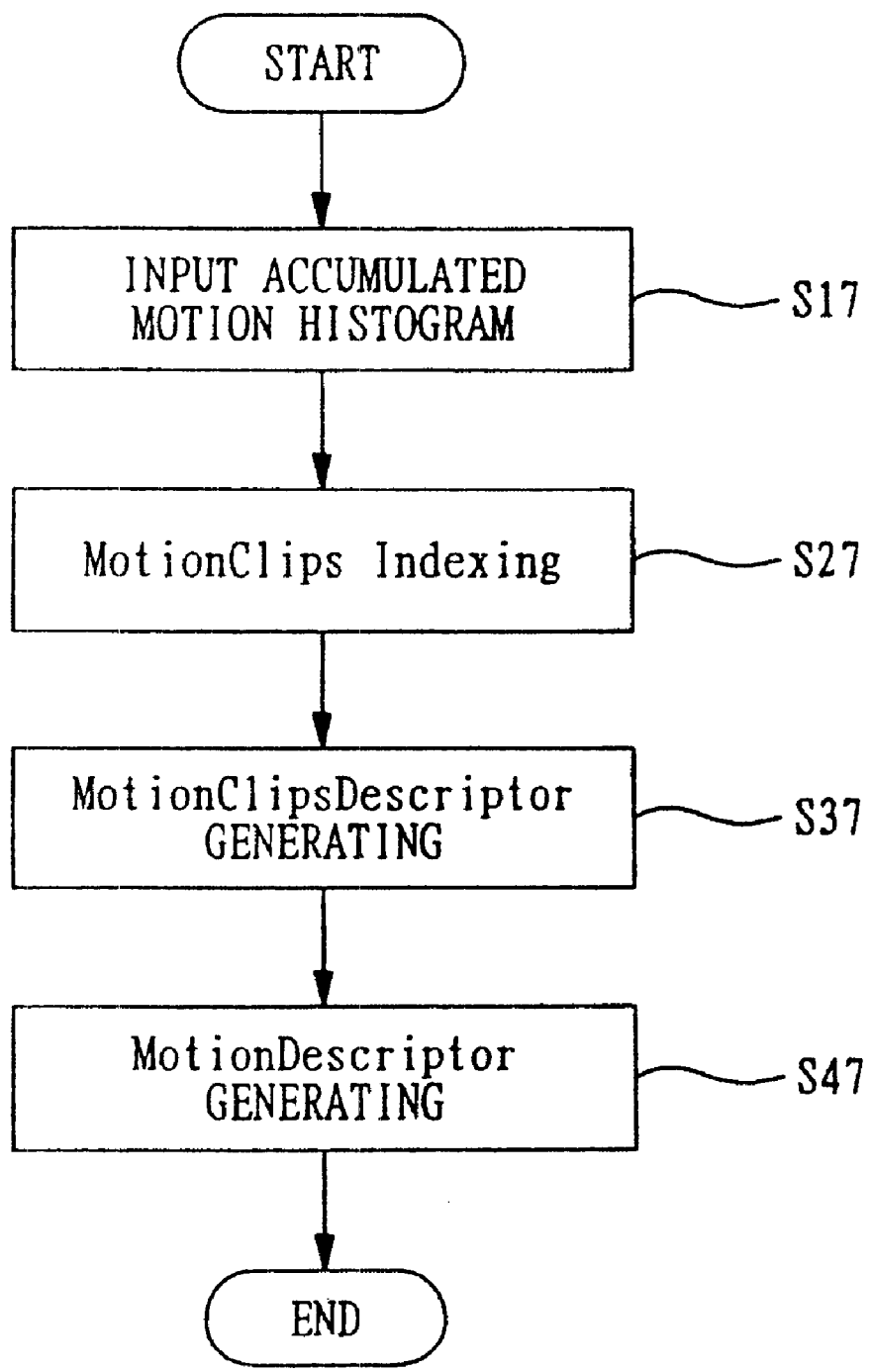
FIG. 15A and FIG. 15B are detailed flow chart of a step of generating a motion descriptor in FIG. 12A to FIG. 12J.

In general, since a video may be comprise of much more scenes than the above example, the data amount of the accumulated motion histogram to express the motion characteristics increases. In order to cope with the search time which increases as the data amount of the accumulated motion histogram increases, motion descriptor is suggested by the present invention for promoting effective index of the accumulated motion histogram. According to the suggested motion descriptor, characteristics of the accumulated motion histogram is analyzed and divided into sections per similar characteristics. Therefore, the motion characteristics of the accumulated motion histogram data included in a clip may be effectively and flexibly reflected to the motion descriptor, for thereby suggesting more rapid search. The whole flow of the motion descriptor generating process is as shown in FIG. 15A.

As an accumulated motion histogram is input to the change amount computing part 161 (S17), a change amount of the accumulated motion histogram is computed. Then, the clip-index part 162 performs index of temporal position and the numbers of clip (S27), and generates a clip motion descriptor (S37).

The motion descriptor generating unit 36 generates a motion descriptor by using the information which is described by the clip motion descriptor generated in the clip-time index part 162 (S47).

Now, the motion descriptor will be described in more detail. The motion descriptor is divided per clips according to the change with relation to time for the accumulated motion histogram which expresses the whole video, and describes the characteristics of the divided clips. The clip motion descriptor represents characteristics information for the histogram data between time positions in which the change amount ΔHt exceeds a threshold value THΔH. The threshold value may be determined by experimental or statistical methods. The motion descriptor is equal to the clip motion descriptor.

Figure 15B:
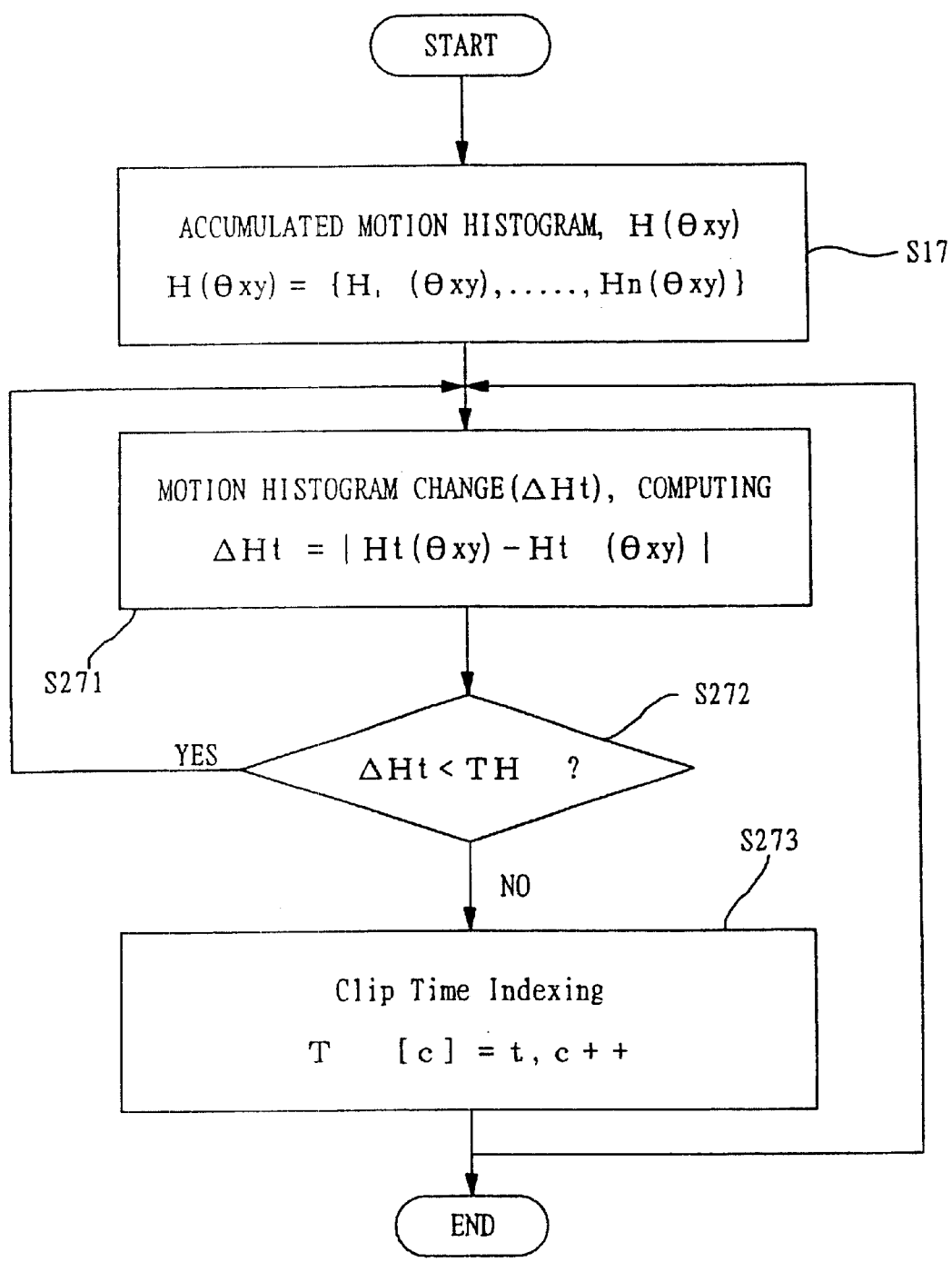

FIG. 15B shows the clipping procedure.

In FIG. 15B, the part for computing change amount of the motion histogram 161 computes the change amount of the motion histogram ΔHt by the following formula (7), as the accumulated motion histogram as shown by formula (6) is input from the motion histogram accumulation part 5 (S271):

$$H(\theta xy) = \{H_1(\theta xy), \ldots, H_n(\theta xy)\} \quad (6)$$

$$\Delta H_t = |H_t(\theta xy) - H_{t-1}(\theta xy)| \quad (7)$$

The comparing part 163 compares the change amount ΔHt which is computed in the change amount computing part 161 with the predetermined threshold value THΔH (S272) and enables the change amount computing part 161 if the threshold value THΔH is larger than the change amount ΔHt to repeat the step (S271) while enables the clip-time index part 162 if the threshold value THΔH is equal to or smaller than the change amount ΔHt.

The clip-time index part 162 is enabled by the comparing part 163 and performs indexing the temporal position of the clip by sequentially increasing the change time t and the number of clip c, which are computed in the change amount computing part 161 (S273).

Figure 11:
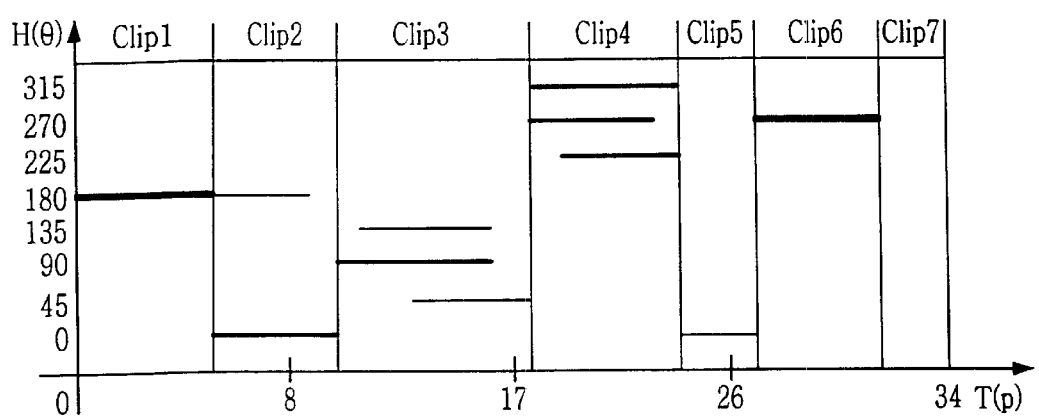
FIG. 11 is an illustrative view for explaining index (clip) of the accumulated motion histogram which is accumulated in the accumulated motion histogram generating unit.

FIG. 11 illustrates the clipping which is performed with relation to the FIG. 10 by using the above method. In FIG. 11, the accumulated motion histogram is divided into 7 clips, which have characteristics information as to the frequency of the direction with relation to each direction, and represents duration on the X axis with relation to the accumulated histogram. The clip intensity and the duration of the accumulated histogram expressed by the clip have no limitation in their overlapping. Further, in expression, a single clip may be subdivided again. However, for the sake of precise search and valid expression, all motion histogram which express a video may belong to one or more clips.

Now, the information which is described by the clip motion descriptor generated by the motion descriptor generating unit 36 as shown in FIG. 4 are as follows:

As shown in Table 1, the motion descriptor is comprised of a video descriptor for describing video ID (video_id), a time descriptor (time_des) for describing a temporal position of the video, a level for describing the motion description level, a direction descriptor (direction_des) for describing 3-D information with relation to the motion direction, an intensity descriptor (intensity_des) for describing 3-D information with relation to motion intensity, flag_used_des for describing direction and intensity information which are useful for video search, a sub-motion descriptor (mot_sub_des) for describing motion characteristics of next stage, and number of sub-descriptor (n) for indicating flag_exist_sub_des and the number of the Mot_sub_des.

In the present invention, in order to statistically describe the representative images or motion characteristics with relation to the structure units of the video, story, scene, shot, segment and sub-segment which are mentioned in the video structure, motion direction and motion intensity average which are represented by the motion descriptor, the motion direction and motion intensity average is performed by using the central moment with relation to the average and standard deviation, and 3-D accumulated motion histogram with relation to the motion data, wherein the search descriptors are as follows:

TABLE 1

| | Motion Descriptor | |
|---|---|---|
| Video ID | Time Descriptor | Direction Descriptor |
| video_id (Intensity Descriptor) intensity_des | time_des (Motion Descriptor) sub_des[1] — sub_des[n] | direction_des |

TABLE 2

| MotionDescriptor { | |
|---|---|
| VideoID | video_id |
| TimeDescriptor | time_des |
| DirectionDescriptor | direction_des |
| IntensityDescriptor | intensity_des |
| NumberOfSubDescriptor | n |
| MotionDescriptor | sub_des[n] |
| } | |

When the characteristics are described by using the motion descriptors, additional descriptors, which is comprised of recusive sentences as shown in table 1, is used when it is necessary to express motion characteristics of structured video into the hierarchy structure or more detailed characteristics are required to express, as described in the expression of concept of the motion descriptors according to the video data structure as shown in table 2.

The video ID, which is the descriptor of the video of which meta information are described by the motion descriptor, are represented as the below table 3 in order to distinguish different versions of a same name.

TABLE 3

Video ID

| Video Name | Video Credits | Video Date | Video Versions |
|---|---|---|---|
| title | credit | date | version |

TABLE 4

```
VideoID {
    VideoName        title
    Credits          credit
    Date             date
    Version          version
}
```

The video descriptor ID of table 3 is comprised of a credit for identifying video name, video title, video producer, source and offerer, production date of the video and version of the video.

In the present invention, the respective fields of table 3 may be selectively used according to each situation and other video ID rather than those of table 3 may be used. Further, description of the video ID in the motion description is not limited since the description of the video ID may differ depending on its application fields. FIG. 4 represents syntax of video descriptors of table 3.

The time descriptor is comprised of a sequential time descriptor and a random time descriptor according to whether the motion descriptor represents all motion data in the description scope or not.

The sequential time descriptor represents all motion data and characteristics within a time descriptor and is to describe start time, end time, and duration of a motion data as shown in Table 5. The duration means the time duration between the starting time and the ending time and information as to the time of all accumulated histogram data. Therefore, the ending time or duration may be selectively used.

The random time descriptor means partial motion data and characteristics within the time descriptor and defined as shown in table 5. In order to effective expression of the time descriptor, the sequential time descriptor and the random time descriptor may be used together.

TABLE 5

Time Descriptor

| Sequential Time Descriptor | | | Random Time Descriptor |
|---|---|---|---|
| Start Time | Duration | End Time | Temporal Position |
| start | duration | end | s[1].......s[n] |

TABLE 6

```
TimeDescriptor {
    Flag                        usedSequentional
    if(usedSequential) {
        StartPosition           start
        EndPosition             end
        Duration                duration
    }
    Flag                        usedRandom
    if(usedRandom) {
        NumberOfPosition        n
        Position                s[n]
    }
}
```

The used sequential flag filed of the time descriptor syntax as shown in table 6 represents whether the sequential time descriptor is used or not, and the used random flag field represents whether the random time descriptor is used or not. The number of position corresponds to the total number of the frames which are expressed in the random time descriptor.

In the present invention, the time descriptors within the motion descriptor may be selectively used according to each situation as shown in table 5, and other video time descriptors rather than those of table 5 may be used.

Next, the motion direction descriptor is to describe statistic characteristics of motion direction with relation to motion data for respective images or the whole images in the time which is intended by the time descriptor, and comprised of a motion direction average, central moment for the average and standard deviation, dominant motion direction, accumulated motion histogram and direction data. The 2-D motion information may be represented by MV=(MVx, MVy), wherein MVx is a motion component (length) in the horizontal direction and MVy is a motion component (length) in the vertical direction. The motion direction of the motion vectors may be obtained by the formula (8):

$$\phi_k = \tan^{-1}(MV_{yk}/MV_{xk}) \tag{8}$$

There may be many methods for computing the direction by using the motion vector and it is not limited particularly in its use. In the formula 8, MVxk, MVyk represent the motion information about kth area when a image is divided into M areas.

ρi is the average of motion direction of ith image in the video, which is obtained by formula (9). Many methods for computing the average of motion direction exists rather than the formula (9).

$$\rho_i = \sum_{j=0}^{M} \psi_j / M \tag{9}$$

θ1 is an average of motion direction averages (ρ) in T images which is intended by the time descriptor in the motion descriptors, which is obtained by formula (10). Also, there are many methods to computing the average of the motion direction averages (ρ) rather than the formula (10).

$$\theta_1 = \sum_{i=0}^{T} \rho_i / T \quad (10)$$

wherein T may not equal to numbers of all images intended by the time descriptor.

The temporal distribution of the motion direction represents characteristics of temporal distribution and distortion degree with relation to the direction averages (ρ) of respective images in the direction average (θ1), which is Obtained by below formula (11):

$$\theta_p = \sqrt{\sum_{i=0}^{T} (\rho_i - \theta)^p} \Big/ T, \quad P \geq 2. \quad (11)$$

The direction standard deviation στi represents the characteristics about the spatial distribution with relation to the motion direction of the ith image among the T images which is intended by the time descriptor, which is obtained by formula (12). Also, there are many methods to computing the direction standard deviation στi rather than the formula (12).

$$\sigma_{\tau i} = \sqrt{\sum_{j=0}^{M} (\psi_j - \rho_i)^2} \Big/ M \quad (12)$$

The average σθ1 of the standard deviation which represents spatial distribution of direction about the total T images in the time may by obtained by formula (13). Also, there are many methods to computing the average. Also, there are many methods to computing the average of the standard deviation σθ1 rather than the formula (13):

$$\sigma_{\theta I} = \sum_{i=0}^{T} \sigma_{\tau i} / T \quad (13)$$

The central moment for the standard deviation of direction represents spatial distribution and distortion with relation to the standard deviations (στi) of respective images in standard deviation averages (σθ1), which may have p-dimensional moment (σθp). The p-dimensional moment (σθp) is obtained by below formula (14). Also, there are many methods to computing the p-dimensional moment (σθp) rather than the formula (14):

$$\sigma_{\theta p} = \sqrt{\sum_{i=0}^{T} (\sigma_{\tau i} - \sigma_{\theta I})} \Big/ T, \quad P \geq 2. \quad (14)$$

The dominant direction of motion represents a direction of which histogram value is largest among motion histograms. Histogram values are sorted in sequence to determine a plurality of dominant directions in sequence of the histogram value. The data of video motion length represents an average of the averages of the motion intensity for the respective bins of the accumulated motion histogram with relation to the motion direction.

The direction descriptor, which describes the characteristics about the motion direction of the video contents as described above, is summarized in table 7.

TABLE 7

Direction Descriptor

| Average of Motion Direction | Temporal Distribution of Motion Direction | Average of Motion Direction Deviation | Spatial Distribution of Motion Direction |
|---|---|---|---|
| $\theta_1$ | $\theta_2 - \theta_p$ | $\sigma_{\theta 1}$ | $\sigma_{\theta 2} - \sigma_{\theta p}$ |
| Dominant Motion Direction | Accumulated Motion Histogram | Data Of Video Motion Length | |
| $\beta_1 - \beta_k$ | $H_\theta$ | $n_1 - n_m$ | |

Table 8 represents a syntax of the motion direction descriptor, which expresses the motion descriptor according to the video structure conceptionally. In table 8, the flag of the flag_exist_sub_des is a recusive sentence for describing the characteristics by using the motion direction descriptors, which is used when it is necessary to express motion direction characteristics of structured video into hierarchy structure or more detailed direction characteristics are required to express, as described in the expression of concept of the motion descriptors according to the video structure as shown in table 2.

TABLE 8

```
DirectionDescriptor {
    AverageOfDirection              θ₁
    DimensionOfMoment               p
    TemporalDistribution            θ₂-θₚ
    SDeviationOfDirection           σθ₁
    SpatialDistribution             σθ₂-σθₚ
    NumberOfDominantDirection       k
    DominantDirection               β₁-βₖ
    MotionHistogramDescriptor       Hθ
    DataOfVideoMotionLength         n
    Flag                            flag_exist_sub_des
    if (flag_exist_sub_des) {
        NumberOfDirectionDescriptor n
        DirectionDescriptor         sub_direction_des[n]
    }
}
```

The intensity descriptor is to describe statistical characteristics of motion intensity for motion data with relation to the respective images or the whole images in the time which is intended by the time descriptor, and comprised of an average of intensity, central moment of the averages and standard deviations, accumulated intensity histogram and intensity data.

Basically, 2-dimensional motion information is comprised of direction and intensity and may be represented in MV=(MVx, MVy), wherein MVx is the motion component (length) in the horizontal direction and MVy is the motion component (length) in the vertical direction.

Motion intensity (I) in the motion vector may be obtained by formula (15) and also may be obtained by any other methods rather than the formula (15):

$$I_k = \sqrt{(MV_{yk} \times MV_{yk} + MV_{xk} \times MV_{xk})} \quad (15)$$

wherein, MVxk and MVyk are the motion information of k-th area when a image is divided into M areas.

λi is the average of motion intensity of ith image in the video, which is obtained by formula (16). Many methods for computing the average of motion intensity exists rather than the formula (16) and there is no limitation in the method for computing the motion intensity.

$$\lambda_i = \left(\sum_{j=0}^{M} I_j\right) / M\lambda i \quad (16)$$

ω1 is an average of motion intensity averages (λ) in T images which is intended by the time descriptor in the motion descriptors, which is obtained by formula (17). Also, there are many methods to computing the average of the motion direction averages (λ) rather than the formula (17).

$$\omega_1 = \left(\sum_{i=0}^{T} \lambda_i\right) / T \quad (17)$$

wherein T may not equal to numbers of all images intended by in the time descriptor.

The central moment for the motion intensity represents temporal distribution and distortion with relation to the intensity average (λ) of the respective images in the intensity averages (ω1), which may have q-dimensional moment (ωq). The p-dimensional moment (ωq) is obtained by below formula (18). Also, there are many methods to computing the q-dimensional moment (ωq) rather than the formula (18) and there is no limitation in the method for computing the q-dimensional moment (ωq):

$$\omega_q = \sqrt{\sum_{i=0}^{T} (\lambda_i - \omega_1)^q} / T, \quad q \geq 2 \quad (18)$$

The standard intensity deviation (σλi) represents the characteristics of spatial distribution of motion intensity with relation to ith image in T images in the time which is intended by the time descriptor, which is obtained by below formula (19). Also, there are many methods to computing the intensity standard deviation (σλi) rather than the formula (19) and there is no limitation in the method for computing the intensity standard deviation (σλi):

$$\sigma_{\lambda i} = \sqrt{\sum_{j=0}^{M} (I_j - \lambda_i)^2} / M \quad (19)$$

The average of the standard deviations (σω1) represents an average of the spatial distribution of intensity with relation to total T images in the time, which is obtained by below formula (20). Also, there are many methods to computing the average of the standard deviations (σω1) rather than the formula (19) and there is no limitation in the method for computing the average of the standard deviations (σω1):

$$\sigma_{\omega l} = \left(\sum_{i=0}^{T} \sigma_{\lambda i}\right) / T \quad (20)$$

The central moment for the standard deviation of the motion intensity represents spatial distribution and distortion with relation to the standard deviations (σωq) of the respective images in the standard deviation averages (σωq), which may have q-dimensional moment (σωq). The q-dimensional moment (ωq) is obtained by below formula (21). Also, there are many methods to computing the q-dimensional moment (σωq) rather than the formula (21) and there is no limitation in the method for computing the q-dimensional moment (σωq):

$$\sigma_{\omega q} = \sqrt{\sum_{i=0}^{T} (\sigma_{\lambda i} - \sigma_{\omega l})^q} / T, \quad q \geq 2 \quad (21)$$

The data of video motion direction represents average of motion direction with relation the respective bins of the accumulated motion histogram for motion intensity.

The intensity descriptor which describes the characteristics of motion intensity of video content as above, is summarized as below table 9.

TABLE 9

| Intensity Descriptor | | |
|---|---|---|
| Average of Motion Intensity | Temporal Distribution of Motion Intensity | Average of Motion Intensity Deviation |
| $\omega_1$ | $\omega_2$–$\omega_q$ | $\sigma_{\omega 1}$ |
| Spacial Distribution of Motion Intensity | Accumulated Motion Intensity Histogram | Data of Video Motion Direction |
| $\sigma_{\omega 2}$–$\sigma_{\omega q}$ | $H_\omega$ | $n_1$–$n_m$ |

Below table 10 represents a syntax of the motion intensity descriptor, wherein the motion descriptor is expressed conceptionally according to the video structure. In table 10, the flag of the flag_exist_sub_des is a recusive sentence for describing the characteristics by using the motion intensity descriptors, which is used when it is necessary to express motion characteristics of structured video into hierarchy structure or more detailed characteristics are required to express, as described in the expression of concept of the motion descriptors according to the video structure.

TABLE 10

| | |
|---|---|
| IntensityDescriptor { | |
|     AverageOfIntensity | $\omega_1$ |
|     DimensionOfMoment | q |
|     TemporalDistribution | $\omega_2$–$\omega_q$ |
|     SDeviationOfIntensity | $\sigma_{\omega 1}$ |
|     SpatialDistribution | $\sigma_{\omega 2}$–$\sigma_{\omega q}$ |
|     MotionHistogramDescriptor | $H_\omega$ |
|     DataOfVideoMotionDirection | n |
|     Flag | flag_exist_sub_des |
|     if (flag_exist_sub_des) { | |
|         NumberOfIntensityDescriptor n | |
|         IntensityDescriptor | sub_intensity_des[n] |
|     } | |
| } | |

The motion histogram descriptor represents statistical characteristics about motion direction or intensity, which is comprised of number of histogram bin, bin value of histogram or data of video motion histogram that is the frequency value in the respective bins, and representative value of bin in the actual data meant by the bin.

The number of motion histogram bin corresponds to the bin number of accumulated histograms with relation to the motion intensity and direction, that is the number of motion data group that the histogram is to express. The data of video motion histogram means the accumulated motion histogram data with relation to the motion intensity and direction.

The motion histogram descriptor is summarized in table 11.

In general, the number of histogram bin (n) may be determined considering the precision of characteristics to express by the histogram and the amount of the whole data.

TABLE 11

Motion Histogram Descriptor

| Number Of Bins | Bin Value Of Histogram |
|---|---|
| n | bin_value[1] |
|  | – |
|  | bin_value[n] |
| Representative Value Of Bin | Accumulated Motion Histogram of Lower hierarchy |
| rvalue_of_each_bin[1] | $H_1$–$H_m$ |
| – |  |
| rvalue_of_each_bin[n] |  |

Table 12 represents the syntax of motion histogram descriptor. In table 12, the number of sub-histogram and the motion histogram descriptor are to describe detailed or amended information of the motion characteristic information by using 3-D auxiliary histograms. For example, in case of using the motion direction accumulated histogram (Hθ), the motion histogram descriptor may describe the information for the motion intensity of the respectively bins, and it is possible to us other accumulated motion histogram which is generated by other methods rather than the motion direction accumulated histogram.

TABLE 12

```
MotionHistogramDescriptor {
    NumberOfBins              n
    BinValueOfHistogram       bin_value[1] ... bin_value[n]
    RepresentativeValueOfBin  rvalue_of_each_bin[1] ...
                              rvalue_of_each_bin[n]
    NumberOfSubHistogram      m
    MotionHistogramDescriptor H1–Hm
}
```

Table 13 and Table 14 represent the description of motion characteristics information which is described into several hierarchy structure according to the general video structure by using the motion descriptor which is suggested by the present invention. In table 13, MD is the abbreviation of motion descriptor.

TABLE 13

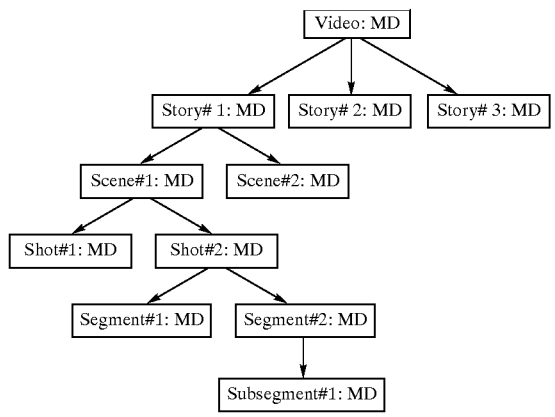

TABLE 14

```
Video : MotionDescriptor {
    VideoID              video_id
    ...
    NumberOfSubDescriptor    3
    Story#1 : MotionDescriptor {
        ...
        NumberOfSubDescriptor    2
        Scene#1 : MotionDescriptor {
            ..
            NumberOfSubDescriptor    2
            Shot#1 : MotionDescriptor {
                ...
                NumberOfSubDescriptor        0
            }
            Shot#2 : MotionDescriptor {
                ...
                NumberOfSubDescriptor        2
                Segment#1 : MotionDescriptor {
                    ...
                    NumberOfSubDescriptor        0
                }
                Segment#2 : MotionDescriptor {
                    ...
                    NumberOfSubDescriptor        1
                    Subsegment#1 : MotionDescriptor {
                        ...
                        NumberOfSubDescriptor        0
                    }
                }
            }
        }
        Scene#2 : MotionDescriptor {
            ...
            NumberOfSubDescriptor        0
        }
    }
    Story#2 : MotionDescriptor {
        ...
        NumberOfSubDescriptor        0
    }
    Story#3 : MotionDescriptor {
        ...
        NumberOfSubDescriptor        0
    }
}
```

Table 14 represent the motion descriptor which is expressed conceptionally according to the video structure. In table 14, the motion descriptor may describe the characteristics of video motion data by the structure units of the video, story, scene, shot, segment and sub-segment which are mentioned in the video structure, motion direction average and motion intensity average, wherein the motion characteristics may be described into hierarchy structure in the manner that those of the upper levels are general and those in the lower levels are specific.

In the search by using the video motion characteristics which are described by the motion descriptor, it is possible to conduct a search with users' desired characteristics information by assigning the available flag_used_direction_des and used_intensity_des per the respective fields in the descriptors as shown in table 15. Further, by suing the exit_sub_des flag, it becomes possible to conduct a search for the whole video or a specific unit section.

TABLE 15

```
MotionDescriptor {
    VideoID                         video_id
    TimeDescriptor                  time_des
    MotionDescriptionLevel          level
    Flag                            used_direction_des
    Flag                            used_intensity_des
    if (used_direction_des)
        MotionDirectionDescriptor   direction_des
    if (used_intensity_des)
        MotionIntensityDescriptor   intensity_des
    Flag                            flag_exist_sub_des
    if (exist_sub_des) {
        NumberOfDescriptor          n
        MotionDescriptor            mot_sub_des[n]
    }
}
```

It is also possible to conduct a search by stages for the direction descriptor and intensity descriptor by assigning the available flags for the averages, central moments and histograms.

Figure 16:
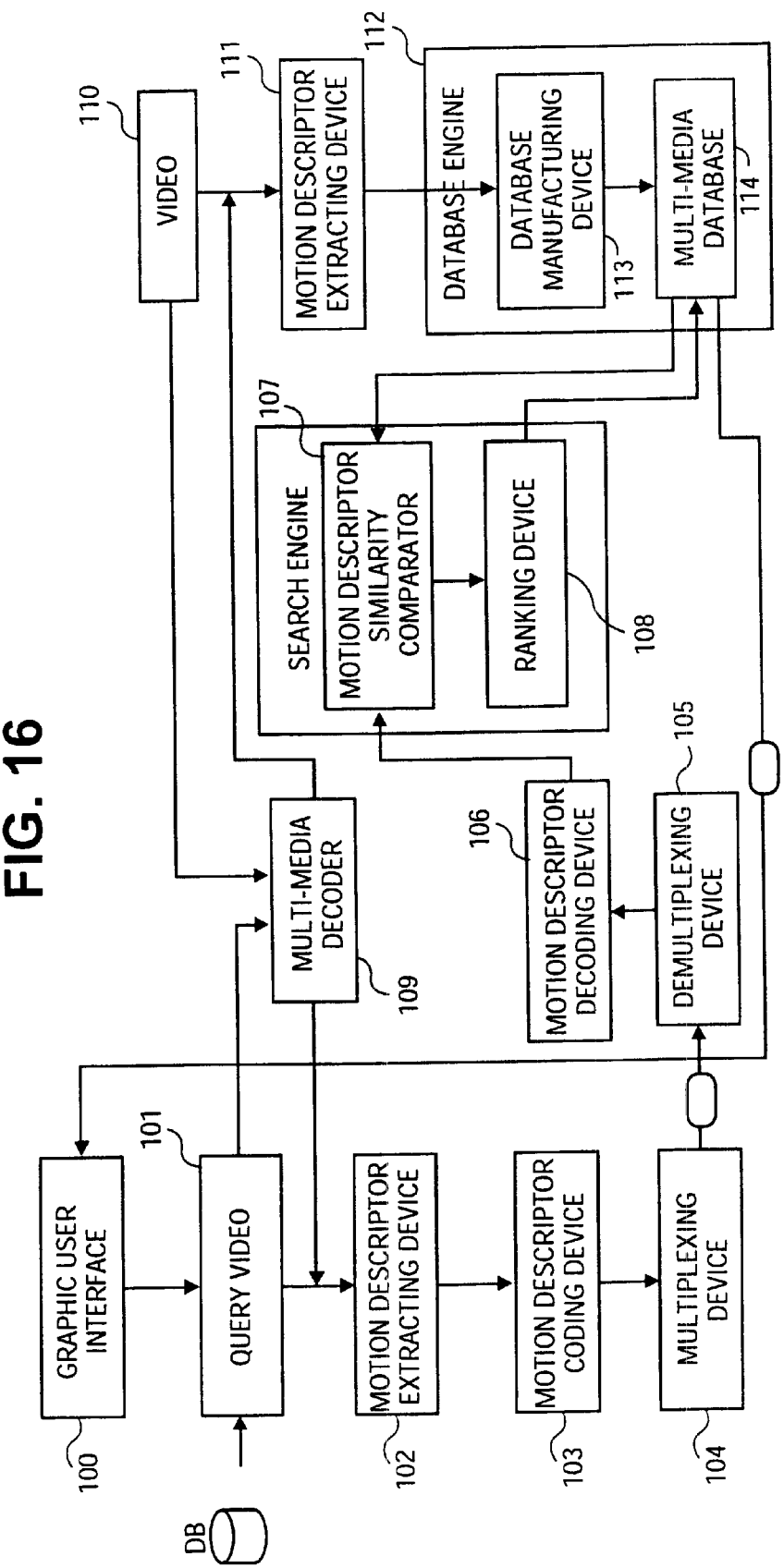
FIG. 16 is an illustrative view of a video search system by unit of motion descriptor by using accumulated motion histogram according to an embodiment of the present invention.
Figure 17A:
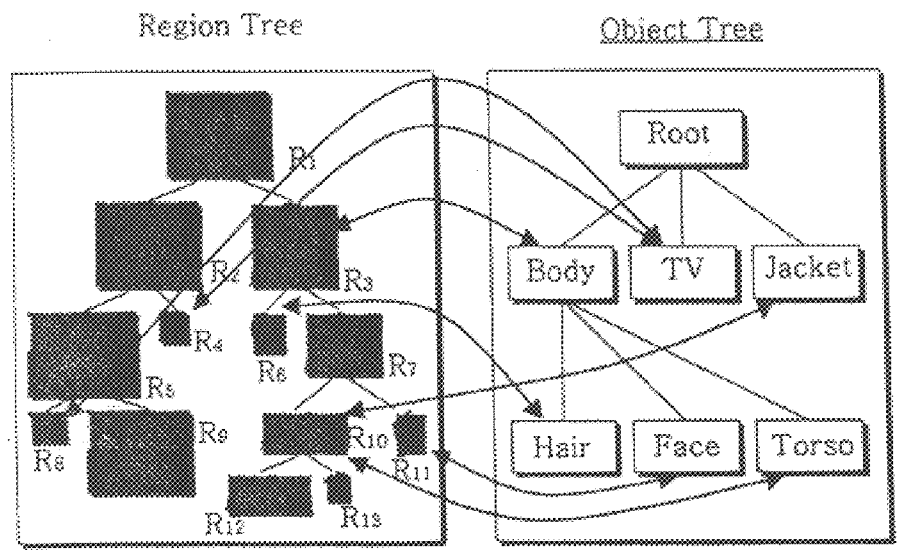
FIG. 17A is a view for explaining structure of still-images.
Figure 17B:
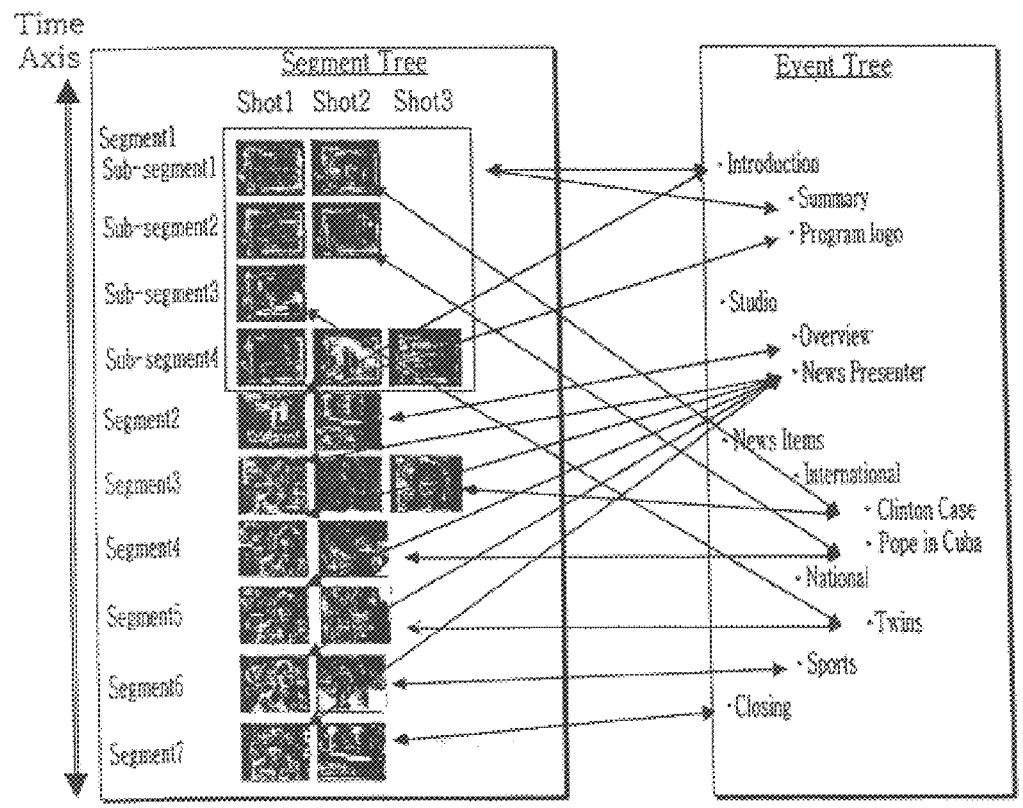
FIG. 17B is a view for explaining structure of video.
Figure 18:
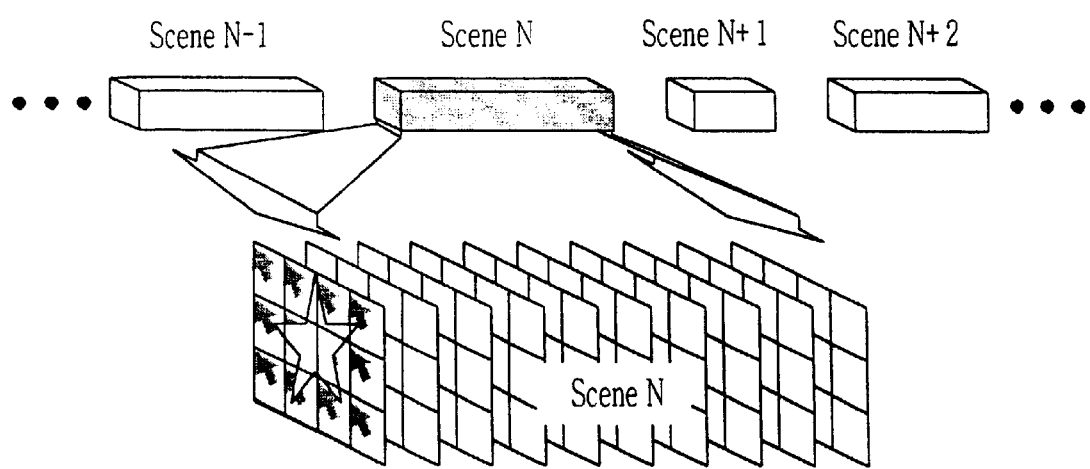
FIG. 18 is a view for explaining structure of video by units of scene.

FIG. 16 represents a system for conducting video searches by adopting motion descriptors as suggested by the present invention. Now, referring to FIG. 16, the operation of the video search system by using the motion descriptor of the accumulated direction histogram will be described in detail.

First, a motion descriptor is extracted by means of a motion descriptor extracting unit 102 from a query video 101 which is interfaced by means of a user interface 100 or extracted from a database DB. The extracted motion descriptor is coded in a motion descriptor coding device (103), multiplexed through a multiplexing device 104 and transmitted toward a network.

The multiplexed motion descriptor is demultiplexed by a demultiplexing device 105 in a server and decoded in the decoding device 106. A motion descriptor similarity comparator 107 in a search engine compares the motion descriptor which is decoded in the motion descriptor decoding device 106 with a motion descriptor which is stored in a multimedia database 114, so that the motion descriptor, of which similarity is higher as a result of the comparison, may rank as a predetermined number.

On the other hand, after the motion descriptor is extracted by means of the motion descriptor extracting device 111, a video 110 in the server is stored in the multimedia database 114 via the database manufacturing device 113.

As above, the technique which is suggested by the present invention may be applied to the motion descriptor extracting device, as shown in FIG. 16.

According to the present invention, the video search utilizes the accumulated motion histogram data and the motion descriptor which describes the accumulated motion histogram data effectively, and may utilize the conventional similarity measure methods such as SAD-Sum of Absolute Difference, and MSE Mean Square Error, etc. for the motion flow and pattern of a whole video or a specific sections by utilizing motion characteristics information describing the characteristics in the motion descriptor, motion characteristics information describing the characteristics in the clip motion descriptor, and hierarchy structure of the clip motion descriptor describing the motion descriptor. Further, if more detailed similarity measurement is requried, the data of video motion histogram or data of video motion length in the motion descriptor may be utilized. Furthermore, video search by using the time such as start_time and end_time may be achieved.

As described hereinabove, according to the present invention, it is advantageous in the view of expense to use descriptors of motion characteristics information of the video to be used in the multimedia data search.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A motion descriptor generating apparatus by using accumulated motion histogram, comprising:

motion histogram generating means for respectively generating motion histogram with relation to intensity data and direction data of an input motion in video;

accumulated motion histogram generating means for accumulating the motion histogram and generating accumulated motion histogram in a predetermined sequence; and motion descriptor generating means for structuring hierarchy of the video by classifying a unit of the video according to a change amount of the accumulated motion histogram for a predetermined time, which is generated in said accumulated motion intensity histogram generating means, and generating a motion descriptor which describes motion characteristics of the unit of the video based on the hierarchy of the video, wherein said motion descriptor comprises a video ID descriptor, a motion descriptor for describing temporal position of video which is described by a corresponding motion descriptor, a motion description level for displaying a characteristic information describing level of the motion which is described, a direction descriptor for describing three-dimensional characteristics information for the motion direction, a intensity descriptor for describing three-dimensional characteristics information for the motion intensity, selection flag information for direction and intensity which are usable in video search, an additional descriptor for describing motion characteristics of next stage, and flag and numbers of the additional descriptor.

2. The motion descriptor generating apparatus by using accumulated motion histogram according to claim 1, wherein said motion descriptor generating means comprises:

a part for generating a clip motion descriptor using a clip which is indexed using the accumulated motion histogram of the accumulated motion histogram generating means; and a part for generating motion descriptor by using the change amount or the motion histogram which is computed in said part for computing a change amount of accumulated motion histogram.

3. The motion descriptor generating apparatus by using accumulated motion histogram according to claim 2, wherein said part for generating a clip motion descriptor comprising:

a part for computing a change amount of accumulated motion histogram which is generated in said accumulated motion histogram generating means a clip-time index part for indexing temporal position and clip numbers of video which is computed in said part for computing change amount of motion histogram; and a comparison part for comparing the change amount which is computed by said part for computing change amount of motion histogram with a predetermined threshold value, and enabling said part for computing the change amount of the motion histogram or said clip-time index.

4. The motion descriptor generating apparatus by using accumulated motion histogram according to claim 2 or claim 3, wherein the motion descriptor, which is generated by said motion descriptor generating means, describes information onto time of total accumulated motion histogram data.

5. The motion descriptor generating apparatus by using accumulated motion histogram according to claim 2, wherein the motion descriptor, which is generated by said motion descriptor generating means, describes number of bin of the accumulated motion histogram with relation to motion direction.

6. The motion descriptor generating apparatus by using accumulated motion histogram according to claim 2, wherein the motion descriptor, which is generated by said motion descriptor generating means, describes number of clip.

7. The motion descriptor generating apparatus by using accumulated motion histogram according to claim 2, wherein the motion descriptor, which is generated by said motion descriptor generating means, describes an average value of the total accumulated histogram with relation to the motion direction described by the clip motion descriptor.

8. The motion descriptor generating apparatus by using accumulated motion histogram according to claim 2, wherein the motion descriptor, which is generated by said motion descriptor generating means, describes an average value of the motion intensity for each bin of the accumulated motion histogram with relation to the motion direction according to the described time.

9. A method for generating motion descriptors by using accumulated motion histogram, comprising the steps of:

generating motion histogram for respectively generating motion histogram with relation to intensity and direction data of an input motion in video;

generating accumulated motion histogram for accumulating the motion histogram and generating accumulated motion histogram; and structuring hierarchy of the video by classifying a unit of the video according to a change amount of the accumulated motion histogram for a predetermined time, and generating a motion descriptor which describes motion characteristics of the unit of the video based on the hierarchy of the video, wherein said motion descriptor comprises a video ID descriptor, a motion descriptor for describing temporal position of video which is described by a corresponding motion descriptor, a motion description level for displaying a characteristic information describing level of the motion which is described, a direction descriptor for describing three-dimensional characteristics information for the motion direction, a intensity descriptor for describing three-dimensional characteristics information for the motion intensity, selection flag information for direction and intensity which are usable in video search, an additional descriptor for describing motion characteristics of next stage, and flag and numbers of the additional descriptor.

10. The method for generating motion descriptors by using accumulated motion histogram according to claim 9, the motion descriptor generating step comprises the steps of:

generating a clip motion descriptor using a clip which is indexed using the accumulated motion histogram of the accumulated motion histogram generating means; and generating motion descriptor by using the change amount or the motion histogram which is computed in said part for computing a change amount of accumulated motion histogram.

11. The method for generating motion descriptors by using accumulated motion histogram according to claim 10, wherein said step of generating a clip motion descriptor comprising:

computing a change amount of accumulated motion histogram which is generated in the accumulated motion histogram generating step clip-time indexing for generating clip motion descriptor by indexing temporal position and clip numbers of video which is computed in the computation step of motion histogram change amount; and comparing the change amount which is computed by the computation step of motion histogram change amount with a predetermined threshold value, and repeating the computation step of the motion histogram change amount or the clip-time index step.

12. The method for generating motion descriptors by using accumulated motion histogram according to claim 10 or claim 11, wherein the motion descriptor, which is generated by said motion descriptor generation step, describes motion information onto temporal position of the video.

13. The method for generating motion descriptors by using accumulated motion histogram according to claim 10, wherein the motion descriptor, which is generated by the motion descriptor generation step, describes number of bin of the accumulated motion histogram with relation to motion direction.

14. The method for generating motion descriptors by using accumulated motion histogram according to claim 10, wherein the motion descriptor, which is generated by the motion descriptor generating step, describes number of clip.

15. The method for generating motion descriptors by using accumulated motion histogram according to claim 10, wherein the motion descriptor, which is generated by the motion descriptor generating step, describes an average value of the total accumulated histogram with relation to the motion direction described by the clip motion descriptor.

16. A method for generating motion descriptors by using accumulated motion histogram according to claim 10, wherein the motion descriptor, which is generated by the motion descriptor generating step, describes an average value of the motion intensity for each bin of the accumulated motion histogram with relation to the motion direction according to the described time.

17. The motion descriptor generating apparatus by using accumulated motion histogram according to claim 1, further comprising:

divergence processing means of motion estimation value divergence for providing motion search value which is processed according to external frame selection mode to said motion histogram generating means.

18. The motion descriptor generating apparatus by using accumulated motion histogram according to claim 1, further comprising:

motion filtering means for providing an input motion estimation value, of which intensity and direction are computed, to said motion histogram generating means.

19. The motion descriptor generating apparatus by using accumulated motion histogram according to claim 1, further comprising:

motion estimation value divergence processing means for processing to generate motion estimation value according to external frame selection mode; and motion filtering means for computing intensity and direction of the motion estimation values, which are processed in said motion estimation value divergence processing means, and filtering the motion estimation values to provide to said motion histogram generating means.

20. A motion descriptor generating apparatus by using accumulated motion histogram according to claim 17 or claim 19, wherein said divergence processing means of motion estimation value divergence comprises:

an average computation part for computing respective averages between a present first area which has a motion estimation value in a current input image, and a present second area to a present fourth area which are adjacent to and neighboring the present first area, or between the present first area, a previous first area and previous second to previous fourth areas neighboring the previous first area;

an absolute value computation part for respectively computing differences between the present first area and the present second to fourth areas, or between the present first area, and the previous first area and the previous second to fourth areas, and computing respective absolute values of the obtained differences; and a motion vector values comparison/conversion part for comparing the absolute values which are respectively computed in said absolute value computation part, and performing conversion of X, Y motion vectors which are input according to the comparison result.

21. The motion descriptor generating apparatus by using accumulated motion histogram according to claim 20, wherein said average value computation part computes respective average values between the present first area which has the motion estimation value in the current input image, and the present second to the fourth areas neighboring the present first area, when the frame motion mode is present image selection mode.

22. The motion descriptor generating apparatus by using accumulated motion histogram according to claim 20, wherein said average value computation part computes respective average values between the present first area, and the previous first area and the previous second to fourth areas, when the frame motion mode is previous image selection mode.

23. The motion descriptor generating apparatus by using accumulated motion histogram according to claim 20, wherein said motion vector values comparison/conversion part compares the absolute values of the computed differences between the present first area and the present second area and between the present first area and the present third area, and converting the input X, Y motion vector values into 0 if all the absolute values are smaller than a predetermined threshold value, when the frame motion mode is present image selection mode.

24. The motion descriptor generating apparatus by using accumulated motion histogram according to claim 23, wherein said motion vector values comparison/conversion part outputs Y without any conversion and 0 after converting the input X motion vector values into 0, if the absolute value of the computed difference between the present first area and the present second area and the absolute value of the computed difference between the present first area and the present third area are not commonly smaller than the predetermined threshold value, or if the absolute value of the difference between the present first area and the present third area is smaller than the predetermined threshold value.

25. The motion descriptor generating apparatus by using accumulated motion histogram according to claim 23, wherein said motion vector values comparison/conversion part outputs X motion vector value without any conversion and 0 after converting the input Y motion vector value into 0, if the absolute value of the computed difference between the present first area and the present second area and the absolute value of the computed difference between the present first area and the present third area are not commonly smaller than the predetermined threshold value, if the absolute value of the difference between the present first area and the present third area is not smaller than the predetermined threshold value, or if the absolute value of the difference between the present first area and the present second area is smaller than the predetermined threshold value.

26. The motion descriptor generating apparatus by using accumulated motion histogram according to claim 23, wherein said motion vector values comparison/conversion part outputs X, Y motion vector values without any conversion, if the absolute value of the computed difference between the present first area and the present second area and the absolute value of the computed difference between the present first area and the present third area are not smaller than the predetermined threshold value, if the absolute value of the computed difference between the present first area and the present third area is not smaller than the predetermined threshold value, or if the absolute value of the computed difference between the present first area and the present second area is smaller than the predetermined threshold value.

27. The motion descriptor generating apparatus by using accumulated motion histogram according to claim 20, wherein said motion vector values comparison/conversion part compares the absolute value of the computed difference between the present first area and the previous first area, and converting the respective input X, Y motion vector values into 0 if the absolute value is smaller than a predetermined threshold value, when the frame motion mode is previous image selection mode.

28. The motion descriptor generating apparatus by using accumulated motion histogram according to claim 27, wherein said motion vector values comparison/conversion part outputs X, Y motion vector values after respectively converting them into 0, if the absolute value of the computed difference between the present first area and the previous first area is not smaller than the predetermined threshold value, or if all the absolute values of the computed differences between the present first area and the previous second area and between the present first area and the previous third area are commonly smaller than the predetermined threshold value.

29. The motion descriptor generating apparatus by using accumulated motion histogram according to claim 27, wherein said motion vector values comparison/conversion part outputs Y motion vector value without any conversion and 0 after converting the input X motion vector value into 0 if the absolute value of the computed difference between the present first area and the previous first area, if the absolute values of the computed differences between the present first area and the previous second area and between the present first area and the previous third area are not smaller than the predetermined threshold value, or if the absolute value of the computed difference between the present first area and the previous third area is smaller than the predetermined threshold value.

30. The motion descriptor generating apparatus by using accumulated motion histogram according to claim 20, wherein said motion vector values comparison/conversion part outputs X motion vector value without any conversion and 0 after converting the input Y motion vector value into 0, if the absolute value of the computed difference between the present first area and previous first area is not smaller than the predetermined threshold value, if all the absolute values of the computed differences between the present first area and the present second area and between the present first area and the present third area are not smaller than the predetermined threshold value, if the absolute value of the computed difference between the present first area and the present third area is not smaller than the predetermined threshold value, or if the absolute value of the difference between the present first area and the previous second area is smaller than the predetermined threshold value.

31. The motion descriptor generating apparatus by using accumulated motion histogram according to claim 20, wherein said motion vector values comparison/conversion part outputs X, Y motion vector values without any conversion, if the absolute value of the computed difference between the present first area and previous first area is not smaller than the predetermined threshold value, if all the absolute values of the computed differences between the present first area and the previous second area and between the present first area and the previous third area are not smaller than the predetermined threshold value, if the absolute value of the computed difference between the present first area and the previous third area is not smaller than the predetermined threshold value, or if the absolute value of the difference between the present first area and the present second area is smaller than the predetermined threshold value.

32. The motion descriptor generating apparatus by using accumulated motion histogram according to claim 18 or claim 19, wherein said motion filtering means comprises:
  a motion intensity computation part for computing motion intensity by using the X,Y motion vector values which are processed by said motion estimation value divergence means;
  a motion vector value comparison/conversion part for comparing motion intensity which is computed by said motion intensity computation part with a predetermined threshold value, and performing conversion of the motion vectors according to the comparison result;
  a motion direction computation part for computing motion direction by using the motion vector values which are converted by said motion vector value comparison/conversion part; and
  a motion direction quantization/inverse-quantization part for quantizing/inverse-quantizing motion direction which is computed by said motion direction computation part.

33. The motion descriptor generating apparatus by using accumulated motion histogram according to claim 32, wherein said motion vector values comparison/conversion part converts X,Y motion vector values, which are outputted from said motion estimation value divergence part, into 0 when the motion intensity which is computed by said motion intensity computation part is smaller than a predetermined value, and outputs X,Y motion vector values, which are outputted from said motion estimation value divergence part, without any conversion when the motion intensity which is computed by said motion intensity computation part is larger than the predetermined value.

34. The motion descriptor generating apparatus by using accumulated motion histogram according to claim 32, wherein said motion direction quantization/inverse-quantization part performs quantization of the motion direction which is computed by said motion direction computation part, by using either a linear quantization method or a non-linear quantization method.

35. The method for generating motion descriptors by using accumulated motion histogram according to claim 9, further comprising a step of processing motion estimation value divergence for providing motion estimation value to said motion histogram generating means after processing it according to external frame selection mode.

36. The method for generating motion descriptors by using accumulated motion histogram according to claim 9, further comprising a step of motion filtering for providing an input motion estimation value, of which intensity and direction are computed, to said step for generating motion histograms after filtering.

37. The method for generating motion descriptors by using accumulated motion histogram according to claim 9, further comprising the steps of:
  motion estimation value diverging for providing motion estimation value to said motion histogram generating means after processing it according to external frame selection mode; and
  motion filtering for computing intensity and direction of the motion estimation values, which are processed in said motion estimation value divergence means, and filtering the motion estimation values to provide to said step of motion histogram generating.

38. The method for generating motion descriptors by using accumulated motion histogram according to claim 35 or claim 37, wherein said step of motion. estimation value diverging comprises the sub-steps of:
  average computing for computing respective averages between a present first area which has a motion estimation value in a current input image, and a present second area to a present fourth area which are adjacent to and neighboring the present first area, or between the present first area, a previous first area and previous second to previous fourth areas neighboring the previous first area;
  absolute value computing for respectively computing differences between the present first area and the present second to fourth areas, or between the present first area and the previous first area and between the present first area and the previous second to fourth areas, and computing respective absolute values of the obtained differences; and
  motion vector values comparing/converting for comparing the absolute values which are respectively computed in said step of absolute value computing and performing conversion of X, Y motion vectors which are input according to the comparison result.

39. The method for generating motion descriptors by using accumulated motion histogram according to claim 38, wherein said step of average value computing comprises computing respective average values between the present first area which has the motion estimation value in the current input image, and the present second to the fourth areas neighboring the present first area, when the frame motion mode is present image selection mode.

40. The method for generating motion descriptors by using accumulated motion histogram according to claim 38, wherein said step of average value computing comprises computing respective average values between the present first area and the previous first area and between the present first area and the previous second to fourth areas which are neighboring the previous first area, when the frame motion mode is previous image selection mode.

41. The method for generating motion descriptors by using accumulated motion histogram according to claim 38, wherein said step of motion vector values comparing/converting comprises comparing the absolute values of the computed differences between the present first area and the present second area and between the present first area and the present third area, and respectively converting the input X, Y motion vector values into 0 if all the absolute values are smaller than a predetermined threshold value, when the frame motion mode is present image selection mode.

42. The method for generating motion descriptors by using accumulated motion histogram according to claim 41, wherein said step of motion vector values comparing/converting comprises providing Y without any conversion and 0 after converting the input X motion vector values into 0, if the absolute value of the computed difference between the present first area and the present second area and the absolute value of the computed difference between the present first area and the present third area are not commonly smaller than the predetermined threshold value, or if the absolute value of the difference between the present first area and the present third area is smaller than the predetermined threshold value.

43. The method for generating motion descriptors by using accumulated motion histogram according to claim 41, wherein said step of motion vector values comparing/converting comprises providing X motion vector value without any conversion and 0 after converting the input Y motion vector value into 0, if the absolute value of the computed difference between the present first area and the present second area and the absolute value of the computed difference between the present first area and the present third area are not commonly smaller than the predetermined threshold value, if the absolute value of the difference between the present first area and the present third area is not smaller than the predetermined threshold value, or if the absolute value of the difference between the present first area and the present second area is smaller than the predetermined threshold value.

44. The method for generating motion descriptors by using accumulated motion histogram according to claim 41, wherein said step of motion vector values comparing/converting comprises providing X, Y motion vector values without any conversion, if the absolute value of the computed difference between the present first area and the present second area and the absolute value of the computed difference between the present first area and the present third area are not smaller than the predetermined threshold value, if the absolute value of the computed difference between the present first area and the present third area is not smaller than the predetermined threshold value, or if the absolute value of the computed difference between the present first area and the present second area is smaller than the predetermined threshold value.

45. The method for generating motion descriptors by using accumulated motion histogram according to claim 38, wherein said step of motion vector values comparing/converting comprises comparing the absolute value of the computed difference between the present first area and the previous first area, which is computed in said step of absolute value computing, and converting the respective input X, Y motion vector values into 0 if the absolute value is smaller than a predetermined threshold value.

46. The method for generating motion descriptors by using accumulated motion histogram according to claim 45, wherein said step of motion vector values comparing/converting provides X, Y motion vector values after respectively converting them into 0, if the absolute value of the computed difference between the present first area and the previous first area is not smaller than the predetermined threshold value, or if all the absolute values of the computed differences between the present first area and the previous second area and between the present first area and the previous third area are commonly smaller than the predetermined threshold value.

47. The method for generating motion descriptors by using accumulated motion histogram according to claim 45, wherein said step of motion vector values comparing/converting provides Y motion vector value without any conversion and 0 after converting the input X motion vector value into 0 if the absolute value of the computed difference between the present first area and the previous first area, if all the absolute values of the computed differences between the present first area and the previous second area and between the present first area and the previous third area are not smaller than the predetermined threshold value, or if the absolute value of the computed difference between the present first area and the previous third area is smaller than the predetermined threshold value.

48. The method for generating motion descriptors by using accumulated motion histogram according to claim 45, wherein said step of motion vector values comparing/converting provides X motion vector value without any conversion and 0 after converting the input Y motion vector value into 0, if the absolute value of the computed difference between the present first area and previous first area is not smaller than the predetermined threshold value, if all the absolute values of the computed differences between the present first area and the present second area and between the present first area and the present third area are not smaller than the predetermined threshold value, if the absolute value of the computed difference between the present first area and the present third area is not smaller than the predetermined threshold value, or if the absolute value of the difference between the present first area and the previous second area is smaller than the predetermined threshold value.

49. The method for generating motion descriptors by using accumulated motion histogram according to claim 45, wherein said step of motion vector values comparing/converting provides X, Y motion vector values without any conversion, if the absolute value of the computed difference between the present first area and previous first area is not smaller than the predetermined threshold value, if all the absolute values of the computed differences between the present first area and the previous second area and between the present first area and the previous third area are not smaller than the predetermined threshold value, if the absolute value of the computed difference between the present first area and the previous third area is not smaller than the predetermined threshold value, or if the absolute value of the difference between the present first area and the present second area is smaller than the predetermined threshold value.

50. The method for generating motion descriptors by using accumulated motion histogram according to claim 36 or claim 37, wherein said step of motion filtering comprises the steps of:
   motion intensity computing for computing motion intensity by using the X,Y motion vector values which are processed by said step of motion estimation value diverging;
   motion vector value comparing/converting for comparing motion intensity which is computed by said motion intensity computation part with a predetermined threshold value, and performing conversion of the motion vectors according to the comparison result;
   motion direction computing for computing motion direction by using the motion vector values which are converted by said step of motion vector value comparing/converting part; and
   motion direction quantizing/inverse-quantizing for quantizing/inverse-quantizing motion direction which is computed by said step of motion direction computation.

51. The method for generating motion descriptors by using accumulated motion histogram according to claim 50, wherein said step of motion vector values comparing/converting comprises converting X,Y motion vector values, which are outputted from said step of motion estimation value diverging, into 0, when the motion intensity which is computed in said step of motion intensity computing is smaller than a predetermined value, and providing X,Y motion vector values, which are outputted from said step of motion estimation value diverging, without any conversion, when the motion intensity which is computed in said step of motion intensity computing is larger than the predetermined value.

52. The method for generating motion descriptors by using accumulated motion histogram according to claim 50, wherein in said step of motion direction quantizing/inverse-quantizing, quantization of the motion direction, which is computed by said motion direction computation part, is performed by using either a linear quantization method or a non-linear quantization method.

53. The motion descriptor generating apparatus by using accumulated motion histogram according to claim 1, wherein the video ID descriptor is to describe a credit for identifying video name, video producer, source and offerer, production date of the video and version of the video.

54. The motion descriptor generating apparatus by using accumulated motion histogram according to claim 1, wherein the time descriptor includes a sequential time descriptor and a random time descriptor according to whether the motion descriptor represents all motion data in the description scope or not.

55. The motion descriptor generating apparatus by using accumulated motion histogram according to claim 54, wherein the sequential time descriptor is to describe starting time, ending time, and duration of a motion data.

56. The motion descriptor generating apparatus by using accumulated motion histogram according to claim 54, wherein the random time descriptor is to describe partial motion data and characteristics in the time descriptor.

57. The motion descriptor generating apparatus by using accumulated motion histogram according to claim 1, wherein the motion direction descriptor is to describe a average of motion direction ($\theta 1$), temporal distribution of motion direction ($\theta$, p), deviation average of motion direction ($\sigma\theta 1$), spatial distribution of motion direction ($\sigma\theta p$), dominant motion direction, accumulated histogram of motion direction, and motion intensity average for motion direction of each bin.

58. A motion descriptor generating apparatus by using accumulated motion histogram according to claim 57, wherein the motion direction average ($\theta 1$) represents an average of motion direction averages ($\rho$) of T images in a scope which is intended by the time descriptor in the motion descriptor, which is obtained by below formula (10):

$$\theta_1 = \sum_{i=0}^{T} \rho_i / T \tag{10}$$

wherein T may not equal to numbers of all images intended by the time descriptor.

59. The motion descriptor generating apparatus by using accumulated motion histogram according to claim 57, wherein the temporal distribution of the motion direction represents characteristics of temporal distribution and distortion degree with relation to the direction averages ($\rho$) of respective images in the direction average ($\theta 1$), which is obtained by below formula (11):

$$\theta_p = \sqrt{\sum_{i=0}^{T} (\rho_i - \theta)^p} / T, \quad P \geq 2. \tag{11}$$

60. The motion descriptor generating apparatus by using accumulated motion histogram according to claim 57, wherein the deviation average of the motion direction represents an average of the spatial distribution of directions with relation to total T images in the time, which is obtained by below formula (13):

$$\sigma_{\theta 1} = \sum_{i=0}^{T} \sigma_{\tau i} / T. \tag{13}$$

61. The motion descriptor generating apparatus by using accumulated motion histogram according to claim 57, wherein the spatial distribution of motion direction represents characteristics of spatial distribution and distortion with relation to standard deviations ($\sigma\tau i$) of respective images in standard deviation averages ($\sigma\theta 1$), which is obtained by below formula (14):

$$\sigma_{\theta p} = \sqrt{\sum_{i=0}^{T} (\sigma_{\tau i} - \sigma_{\theta 1})} / T, \quad P \geq 2. \tag{14}$$

62. The motion descriptor generating apparatus by using accumulated motion histogram according to claim 57, wherein the dominant direction of motion represents a direction of which histogram value is largest among motion histograms which are generated with relation to direction by using below formula (5), wherein a plurality of dominant directions may be determined in sequence of the histogram value:

$$H(MVi) = SMVi/M \tag{5}$$

wherein, $\Sigma H(MV_i)=1.0$, $M=\Sigma SMV_i$, SMVi represents a sum of the frequency that ith group of motion information to express by using the histogram generates, M represents a sum of the frequency tha motion data to express by using the histogram generates, H(MVi) represents a probability that the ith group of motion information generates, and SMV is a parameter to represent motion direction, motion intensity and motion information except for motion direction and motion intensity.

63. The motion descriptor generating apparatus by using accumulated motion histogram according to claim 1, wherein the intensity descriptor is to describe motion intensity average (ω1), temporal distribution of motion intensity (ωq), deviation average of motion intensity (σω1), spatial distribution of motion intensity (σωq), accumulated histogram of motion intensity (Hω), and average of motion intensity with relation to motion direction.

64. The motion descriptor generating apparatus by using accumulated motion histogram according to claim 63, wherein the motion intensity average (ω1) represents an average of motion intensity averages (λ) of T images in a scope which is intended by the time descriptor in the motion descriptor, which is obtained by below formula (17):

$$\omega_1 = \left(\sum_{i=0}^{T} \lambda_i\right) / T \qquad (17)$$

wherein T may not equal to numbers of all images in the description time.

65. The motion descriptor generating apparatus by using accumulated motion histogram according to claim 63, wherein the temporal distribution of motion intensity (ωq) is obtained by below formula (18):

$$\omega_q = \sqrt{\sum_{i=0}^{T} (\lambda_i - \omega_1)^q} \bigg/ T, \quad q \geq 2. \qquad (18)$$

66. The motion descriptor generating apparatus by using accumulated motion histogram according to claim 63, wherein the deviation average of the motion direction (σω1) represents an average of the spatial distribution of intensity with relation to total T images in the time, which is obtained by below formula (20):

$$\sigma_{\omega I} = \left(\sum_{i=0}^{T} \sigma_{\lambda i}\right) / T. \qquad (20)$$

67. The motion descriptor generating apparatus by using accumulated motion histogram according to claim 63, wherein the spatial distribution of motion intensity (σωq) is obtained by below formula (21):

$$\sigma_{\omega q} = \sqrt{\sum_{i=0}^{T} (\sigma_{\lambda i} - \sigma_{\omega I})^q} \bigg/ T, \quad q \geq 2. \qquad (21)$$

68. The motion descriptor generating apparatus by using accumulated motion histogram according to claim 57 or claim 63, wherein the motion histogram descriptor, which describes accumulated histogram of motion direction and accumulated histogram of motion intensity, represents bin number of histogram, histogram value and representative value of bin.

69. The method for generating motion descriptors by using accumulated motion histogram according to claim 9, wherein the video ID descriptor is to describe a credit for identifying video name, video producer, source and offerer, production time of the video and version of the video.

70. The method for generating motion descriptors by using accumulated motion histogram according to claim 9, wherein the time descriptor is divided into a sequential time descriptor and a random time descriptor according to whether the motion descriptor represents all motion data in the description scope or not.

71. The method for generating motion descriptors by using accumulated motion histogram according to claim 69, wherein the sequential time descriptor is to describe starting time, ending time, and duration of a motion data.

72. The method for generating motion descriptors by using accumulated motion histogram according to claim 69, wherein the random time descriptor is to describe partial motion data and characteristics in a description time.

73. The method for generating motion descriptors by using accumulated motion histogram according to claim 9, wherein the motion direction descriptor is to describe a motion direction average (θ1), temporal distribution of motion direction (θp), deviation average of motion direction (σθ1), spatial distribution of motion direction (σθp), dominant motion direction, accumulated histogram of motion direction, and motion intensity average of motion direction.

74. The method for generating motion descriptors by using accumulated motion histogram according to claim 73, wherein the motion direction average (θ1) represents an average of motion direction averages (ρ) of T images in a scope which is intended by the time descriptor in the motion descriptor, which is obtained by an equation as:

$$\theta_1 = \sum_{i=0}^{T} \rho_i / T$$

wherein T may not equal to numbers of all images intended by the time descriptor.

75. The method for generating motion descriptors by using accumulated motion histogram according to claim 73, wherein the temporal distribution of the motion direction represents characteristics of temporal distribution and distortion degree with relation to the direction averages (ρ) of respective images in the direction average (θ1), which is obtained by an equation as:

$$\theta_p = \sqrt{\sum_{i=0}^{T} (\rho_i - \theta)^P / T}, \quad P \geq 2.$$

76. The method for generating motion descriptors by using accumulated Lotion histogram according to claim 73, wherein the deviation average of the motion direction represents an average of the spatial distribution of directions with relation to total T Images in the time, which is obtained by an equation as:

$$\sigma_{\theta I} = \sum_{i=0}^{T} \sigma_{iI} / T.$$

77. The method for generating motion descriptors by using accumulated motion histogram according to claim 73, wherein the spatial distribution of motion direction represents characteristics of spatial distribution and distortion with relation to standard deviations (στi) of respective images in standard deviation averages (σθ1), which is obtained by an equation as:

$$\sigma_{\theta p} = \sqrt{\sum_{i=0}^{T} (\sigma_{i j} - \sigma_{\theta j})/T}, \quad P \geq 2.$$

78. The method for generating motion descriptors by using accumulated motion histogram according to claim 73, wherein the dominant direction of motion represents a direction of which histogram value is largest among motion histograms which are generated with relation to direction by using below formula (5), wherein a plurality of dominant directions may be determined in sequence of the histogram value:

$$H(MV_i) = SMV_i/M \quad (5)$$

wherein, $\Sigma H(MV_i) = 1.0$, $M = \Sigma SMV_i$, $SMV_i$ represents a sum of the frequency that ith group of motion information to be expressed as the histogram is generated, M represents a sum of the frequency that motion data to be expressed as the histogram is generated, $H(MV_i)$ represents a probability that the ith group of motion information generates, and SMV is a parameter to represent motion direction, motion intensity and motion information except for motion direction and motion intensity.

79. The method for generating motion descriptors by using accumulated motion histogram according to claim 9, wherein the intensity descriptor Is to describe average of motion intensity (ω1), temporal distribution of motion intensity (ωq), deviation average of motion intensity (σωq), spatial distribution of motion intensity (σωq), accumulated histogram of motion intensity (Hω), and average of motion intensity with relation to motion direction.

80. The method for generating motion descriptors by using accumulated motion histogram according to claim 79, wherein the motion intensity average (ω1) represents an average of motion intensity averages (λ) of T times in a scope which is intended by the time descriptor in the motion descriptor, which is obtained by an equation as:

$$\omega_1 = \left(\sum_{i=0}^{T} \lambda_i\right) / T$$

wherein T may not equal to numbers of all images in the description time.

81. The method for generating motion descriptors by using accumulated motion histogram according to claim 79, wherein the temporal distribution of motion intensity (ωq) is obtained by an equation as:

$$\omega_q = \sqrt{\sum_{i=0}^{T} (\lambda_t - \omega_1)^q / T}, \quad q \geq 2.$$

82. The method for generating motion descriptors by using accumulated motion histogram according to claim 79, wherein the deviation average of the motion direction (σω1) represents an average of the spatial distribution of intensity with relation to total T images in the time, which is obtained by an equation as:

$$\sigma_{\omega I} = \left(\sum_{i=0}^{T} \sigma_{\lambda i}\right) / T.$$

83. The method for generating motion descriptors by using accumulated motion histogram according to claim 79, wherein the spatial distribution of motion intensity (σωq) is obtained by an equation as:

$$\sigma_{\omega q} = \sqrt{\sum_{i=0}^{T} (\sigma_{\lambda i} - \sigma_{\omega I})^q / T}, \quad q \geq 2.$$

84. The method for generating motion descriptors by using accumulated motion histogram according to claim 63, wherein the motion histogram descriptor, which describes accumulated histogram of motion direction and accumulated histogram of motion intensity, represents bin number of histogram, histogram value and representative value of bin.

* * * * *